United States Patent
Perry et al.

(10) Patent No.: US 9,940,647 B2
(45) Date of Patent: *Apr. 10, 2018

(54) QUALIFIED VIDEO DELIVERY ADVERTISEMENT

(71) Applicant: Sony Interactive Entertainment America LLC, San Mateo, CA (US)

(72) Inventors: David Perry, Monarch Beach, CA (US); Andrew Buchanan Gault, San Francisco, CA (US); Rui Filipe Andrade Pereira, Aliso Viejo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,144

(22) Filed: Apr. 25, 2017

(65) Prior Publication Data
US 2017/0228799 A1   Aug. 10, 2017

Related U.S. Application Data

(63) Continuation of application No. 13/474,665, filed on May 17, 2012, now Pat. No. 9,633,379, and a
(Continued)

(51) Int. Cl.
| | |
|---|---|
| G06Q 30/02 | (2012.01) |
| H04N 19/44 | (2014.01) |
| A63F 13/335 | (2014.01) |
| A63F 13/35 | (2014.01) |
| A63F 13/85 | (2014.01) |

(Continued)

(52) U.S. Cl.
CPC ....... *G06Q 30/0277* (2013.01); *A63F 13/335* (2014.09); *A63F 13/35* (2014.09); *A63F 13/85* (2014.09); *H04L 29/06027* (2013.01); *H04L 67/10* (2013.01); *H04L 67/18* (2013.01); *H04L 67/38* (2013.01); *H04N 19/44* (2014.11); *A63F 2300/407* (2013.01); *A63F 2300/57* (2013.01)

(58) Field of Classification Search
CPC .................................................. G06Q 30/0277
See application file for complete search history.

(56) References Cited

U.S. PATENT DOCUMENTS

| | | | | |
|---|---|---|---|---|
| 2002/0128908 | A1* | 9/2002 | Levin | G06Q 30/02 705/14.53 |
| 2003/0018767 | A1* | 1/2003 | Chatani | H04L 29/06 709/223 |

(Continued)

*Primary Examiner* — Jimmy H Tran
(74) *Attorney, Agent, or Firm* — Martine Penilla Group, LLP

(57) ABSTRACT

A video server is configured to provide streaming video to players of computer games over a computing network. The video server can provided video of different games to different players simultaneously. This is accomplished by rendering several video streams in parallel using a single GPU. The output of the GPU is provided to graphics processing pipelines that are each associated with a specific client/player and are dynamically allocated as needed. A client qualifier may be used to assure that only clients capable of presenting the streaming video to a player at a minimum level of quality receive the video stream.

20 Claims, 7 Drawing Sheets

Related U.S. Application Data continuation-in-part of application No. 13/109,932, filed on May 17, 2011, now Pat. No. 9,203,685, which is a continuation-in-part of application No. 12/791,819, filed on Jun. 1, 2010, now Pat. No. 9,584,575.

(60) Provisional application No. 61/487,126, filed on May 17, 2011, provisional application No. 61/183,035, filed on Jun. 1, 2009, provisional application No. 61/183,037, filed on Jun. 1, 2009, provisional application No. 61/183,088, filed on Jun. 2, 2009, provisional application No. 61/183,546, filed on Jun. 2, 2009, provisional application No. 61/323,354, filed on Apr. 12, 2010, provisional application No. 61/345,534, filed on May 17, 2010.

(51) Int. Cl.
*H04L 29/08* (2006.01)
*H04L 29/06* (2006.01)

(56) References Cited

U.S. PATENT DOCUMENTS

| | | | |
|---|---|---|---|
| 2003/0101092 A1* | 5/2003 | Fuller | G06Q 30/02 705/14.59 |
| 2006/0004627 A1* | 1/2006 | Baluja | H04M 3/4878 705/14.4 |
| 2007/0239524 A1* | 10/2007 | Tewahade | G06Q 30/02 705/14.55 |
| 2008/0007567 A1* | 1/2008 | Clatworthy | G06Q 30/02 345/619 |
| 2008/0201225 A1* | 8/2008 | Maharajh | G06F 17/30035 705/14.43 |
| 2010/0167816 A1* | 7/2010 | Perlman | A63F 13/12 463/30 |
| 2010/0287040 A1* | 11/2010 | Martin-Cocher | G06Q 30/0241 705/14.4 |

\* cited by examiner

QUALIFIED VIDEO DELIVERY ADVERTISEMENT

CLAIM OF PRIORITY

This application is a continuation application under 35 U.S.C. 120 of prior U.S. patent application Ser. No. 13/474,665, filed May 17, 2012, issued as U.S. Pat. No. 9,633,379, on Apr. 25, 2017, which:

1) claims priority under 35 U.S.C. 119 to U.S. Provisional Patent Application No. 61/487,126, filed May 17, 2011, and
2) is a continuation-in-part application under 35 U.S.C. 120 of prior U.S. patent application Ser. No. 13/109,932, filed May 17, 2011, issued as U.S. Pat. No. 9,203,685, on Dec. 1, 2015, which is a continuation-in-part application under 35 U.S.C. 120 of prior U.S. patent application Ser. No. 12/791,819, filed on Jun. 1, 2010, issued as U.S. Pat. No. 9,584,575, on Feb. 28, 2017, which in turn claims priority under 35 U.S.C. 119 to the following:
   U.S. Provisional Patent Application No. 61/183,035, filed Jun. 1, 2009,
   U.S. Provisional Patent Application No. 61/183,037, filed Jun. 1, 2009,
   U.S. Provisional Patent Application No. 61/183,088, filed Jun. 2, 2009,
   U.S. Provisional Patent Application No. 61/183,546, filed Jun. 2, 2009,
   U.S. Provisional Patent Application No. 61/323,354, filed Apr. 12, 2010, and
   U.S. Provisional Patent Application No. 61/345,534, filed May 17, 2010.

All of the above-identified U.S. Patent Applications and U.S. Patents are incorporated herein by reference in their entirety for all purposes.

BACKGROUND

Field of the Invention

The invention is in the field of video and more specifically in the field of server-side rendering of game video.

Related Art

There are several models for the execution and rendering of video games. In the most simple model a game is executed and rendered on a computing device local to a player of the game. In another model a game state is maintained at a central server and communicated over a computing network to a client where rendering of video takes place. This model is commonly used by multi-player games in which the game state is dependent on inputs received over the computing network from multiple players of the game. In a third model a game state is maintained at a central server that also renders video for delivery to clients over a computing network as a video stream.

SUMMARY

The invention includes a video server system configured to render and provide game video to one or more clients over a computing network, such as the internet. This server is optionally configured to serve multiple video games to multiple clients. The rendered video is based on the state of one or more games that can be maintained at the video game server system and/or received from a separate game server. In some of the embodiments, a single graphics processing unit (GPU) is used to render multiple video streams representative of different video games, and or different viewpoints within a game. For example a single GPU may be used to render video streams for two different game players in parallel. Each of these video streams are based on different (independent) viewpoints of the game players and are typically provided to different clients used by each of the game players.

In some embodiments, a shared memory is used by a 3D video driver to store output of the GPU. This shared memory is accessed by one or more dynamic encoding pipeline. Transfer of video data to and/or from this shared memory is controlled by virtual 3D video drivers. This control allows delivery of the output of a shared GPU to a plurality of shared encoding pipelines in a coordinated manner.

Some embodiments include one or more encoding pipelines configured to be dynamically configured to produce various types of video streams. These pipelines are provisioned to meet specific needs of a client. They are optionally configured to provide more than one type of encoding and to change the encoding applied to a video stream automatically in response to a change in the needs of the client.

Various embodiments of the invention include a video server system comprising a client qualifier configured to remotely determine if a client is qualified to receive a video stream configured for display on the client, the qualification being based on abilities of the client to receive and display the video stream at least a minimum level of quality; a video source configured to provide the video stream, and to provide the video stream only if the client is qualified to receive the video stream as determined by the client qualifier; an I/O device configured for communicating with the client via a communication network; a storage configured to store video data for use by the video source or the client qualifier; and an electronic processor configured to execute software components of the video source or the client qualifier.

Various embodiments of the invention include a game serving system comprising a first game application stored on a computer readable medium and configured to execute a first video game responsive to game commands received from a first client; a second game application stored on a computer readable medium and configured to execute a second game instance responsive to game commands received from a second client; logic configured to execute the first game instance and the second game instance in parallel; a first virtual 3D video driver configured to received a first game environment from the first game application; a second virtual 3D video driver configured to received second game environment from the second game application; a 3D video driver configured to receive an output of the first and second virtual 3D video drivers; a graphics processing unit configured to generate a first video stream by rendering the first game environment, and to generate a second video stream by rendering the second game environment, in parallel; a first encoding pipeline configured to encode the first video stream in a first codec; a second encoding pipeline configured to encode the second video stream in a second codec; and an output configured to provide the first video stream to the first client and the second video stream to the second client.

Various embodiments of the invention include a game serving system comprising a first game application stored on a computer readable medium and configured to execute a first game instance responsive to game commands received from a first client; a second game application stored on a computer readable medium and configured to execute a second game instance responsive to game commands received from a second client; logic configured to execute the first game instance and the second game instance in parallel; a 3D video driver configured to received different game environments from the first game application and from the second game application; a graphics processing unit configured to generate a first video frame by rendering the game environment from the first game application, and to generate a second video frame by rendering the game environment from the second game application; a first encoding pipeline configured to encode the first video frame in a first video format; a second encoding pipeline configured to encode the second video frame in a second video format; a memory shared by at least the 3D video driver and at least the first encoding pipeline; logic configured to transfer the first video frame from the 3D video driver to the shared memory in sync with the production of the second video frame; and an output configured to provide the first video stream to the first client and the second video stream to the second client.

Various embodiments of the invention include a game serving system comprising a first game application stored on a computer readable medium and configured to execute a first game instance responsive to game commands received from a first client; a second game application stored on a computer readable medium and configured to execute a second game instance responsive to game commands received from a second client; logic configured to execute the first game instance and the second game instance in parallel; logic configured to provision a first encoder pipeline and a second encoder pipeline, the first encoder pipeline including a dynamically allocated encoder selected based on needs of the first client, the second encoder pipeline including a dynamically allocated encoder selected based on needs of the second client; one or more processor configured to execute the logic configured to spawn a first encoder pipeline and a second encoder pipeline, the first game application, the second game application; and an output configured to provide a first video stream generated by the first encoder pipeline to the first client, and a second video stream generated by the second encoder pipeline to the second client.

Various embodiments of the invention include a game delivery system comprising a plurality of video server systems each configured to provide streaming video to a plurality of clients over a communication network, the video server systems being geographically distributed, contents of the streaming video being dependent on game commands received from one or more of the clients and game logic included within each of the video server system; and a client qualifier configured to determine if a first of the plurality of clients is qualified to receive the streaming game video and to determine which of the video server system is best qualified to provide the streaming game video to the first of the plurality of clients. Optionally, each of the video server systems is configured to provision a dynamically encoded encoding pipeline responsive to needs of the first of the plurality of clients, and optionally the streaming video is configured to be displayed within a browser. In some embodiments, the determination of which of the video server systems is best qualified is dependent on characteristics of a communication channel between the determined video server system and the first of the plurality of clients.

Various embodiments of the invention include a method comprising receiving a request from a client to display an object, the object being configured to allow a user of the client to play a video game; testing the client to determine if the client is qualified to receive a streaming video of the game; qualifying the client based on the testing; selecting a video server system from among a plurality of geographically distributed video server systems to provide streaming video to the client, contents of the streaming video being dependent on game commands received from the client and game logic of the video game included the selected video server system, the selection being based on which of the plurality of video server systems is best qualified to provide the streaming video to the client. Optionally, the plurality of geographically distributed video systems includes video server systems disposed in different cities. In some embodiments the method further comprises adding a game player to the game and repeating the selecting the video server system, the selection being further based on which of the plurality of video server systems is best qualified to provide streaming video to a client of the added game player, and optionally changing which of the video server systems provides streaming video to the client based on the repeated selection.

Various embodiments of the invention include a video server system comprising: a client qualifier configured to determine if a client is qualified to receive a video stream configured for display on the client, the qualification being based on abilities of the client to receive and display the video stream at least a minimum level of quality; an advertisement source configured to provide an advertisement to the client, functionality of the advertisement being dependent on whether the client has been determined to be qualified to receive the video stream; a video source configured to provide the video stream, and to provide the video stream only if the client is qualified to receive the video stream as determined by the client qualifier; an I/O device configured for communicating with the client via a communication network; a storage configured to store image data for use by the video source or the client qualifier; and an electronic processor configured to execute software components of the video source or the client qualifier.

Various embodiments of the invention include a method of qualifying a client to receive streaming video, the method comprising: receiving a request for an advertisement from a remote client; providing the advertisement to the client; determining that the client is qualified to receive streaming video, after providing the advertisement to the client; based on the determination, changing functionality of the advertisement on the client without changing the appearance of all of the advertisement. This method optionally includes receiving a selection of the advertisement by the client; and providing the streaming video to the client in response to the selection.

Various embodiments of the invention include a method comprising: receiving a request from a first client to display an object, the object being configured to allow a user of the client to play a video game; testing the first client to determine if the first client is qualified to receive a streaming video of the game; qualifying the first client to receive the streaming video, based on the testing; displaying the object on the first client, functionality of the object being dependent of the qualification of the first client; receiving a selection of the object displayed on the first client; and providing the video game as streaming video to the first client, the streaming video being rendered on a remote game server based on game commands received from the first client.

DETAILED DESCRIPTION

Figure 1:
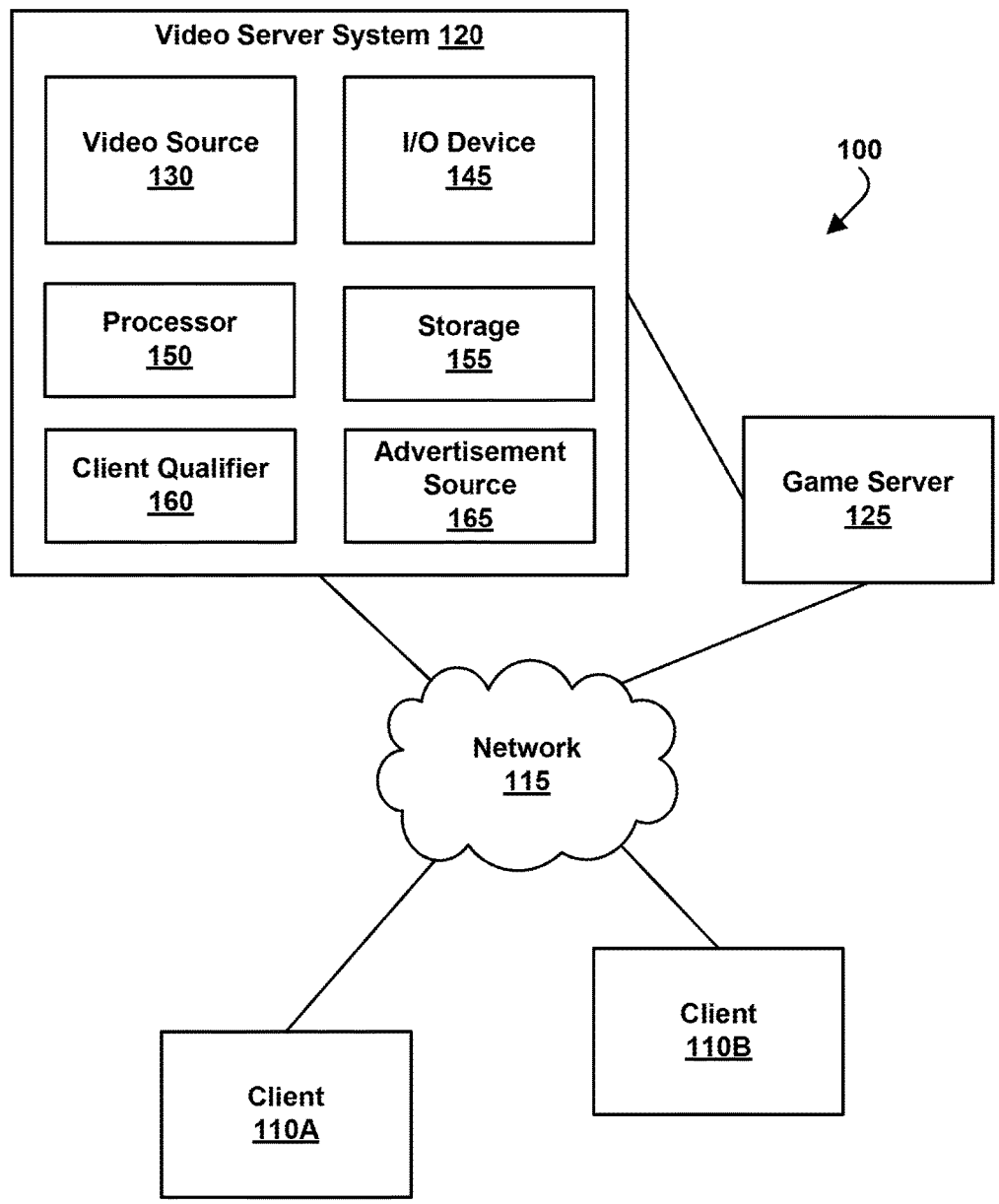
FIG. 1 is a block diagram of a game system, according to various embodiments of the invention.

FIG. 1 is a block diagram of a Game System 100, according to various embodiments of the invention. Game System 100 is configured to provide a video stream to one or more Clients 110 via a Network 115. Game System 100 typically includes a Video Server System 120 and an optional game server 125. Video Server System 120 is configured to provide the video stream to the one or more Clients 110 with a minimal quality of service. For example, Video Server System 120 may receive a game command that changes the state of or a point of view within a video game, and provide Clients 110 with an updated video stream reflecting this change in state with minimal display latency time. As used herein the term "display latency" is meant to refer to the total time between sending a game command from a client and displaying resulting video on the client. Display latency can include network latency, which is dependent on the reliability and bandwidth of communication channels. Display latency can also include the time required to process the game command on the video source, time required to generate the resulting video, time required to receive and display the resulting video at the client, and/or the like.

The Video Server System 120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 110, referred to herein individually as 110A., 110B., etc., may include terminals, personal computers, game consoles, tablet computers, telephones, set top boxes, kiosks, wireless devices, digital pads, stand-alone devices, handheld game playing devices, and/or the like. Typically, Clients 110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 110 or on a separate device such as a monitor or television. Clients 110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 110 are optionally geographically dispersed. The number of clients included in Game System 100 may vary widely from one or two to thousands, tens of thousands, or more. As used herein, the term "game player" is used to refer to a person that plays a game and the term "game playing device" is used to refer to a device used to play a game.

Clients 110 are configured to receive video streams via Network 115. Network 115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 110 may, but are not required to, further include systems configured for modifying received video. For example, a client may be configured to perform further rendering, to overlay one video image on another video image, to crop a video image, and/or the like. For example, Clients 110 may be configured to receive various types of video frames, such as I-frames, P-frames and B-frames, and to process these frames into images for display to a user. In some embodiments, a member of Clients 110 is configured to perform further rendering, shading, conversion to 3-D, or like operations on the video stream. A member of Clients 110 is optionally configured to receive more than one audio or video stream. Input devices of Clients 110 may include, for example, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 110 is generated and provided by Video Server System 120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g., to effect, the images shown to the user. Most of the teachings herein with regard to "video frames" can also be applied to "audio frames."

Clients 110 are typically configured to receive inputs from a user. These inputs may include game commands configured to change the state of the video game or otherwise affect game play. The game commands can be received using input devices and/or may be automatically generated by computing instructions executing on Clients 110. The received game commands are communicated from Clients 110 via Network 115 to Video Server System 120 and/or Game Server 125. For example, in some embodiments, the game commands are communicated to Game Server 125 via Video Server System 120. In some embodiments, separate copies of the game commands are communicated from Clients 110 to Game Server 125 and Video Server System 120. The communication of game commands is optionally dependent on the identity of the command. Game commands are optionally communicated from Client 110A through a different route or communication channel that that used to provide audio or video streams to Client 110A.

Game Server 125 is optionally operated by a different entity than Video Server System 120. For example, Game Server 125 may be operated by the publisher of a multi-player game. In this example, Video Server System 120 is optionally viewed as a client by Game Server 125 and optionally configured to appear from the point of view of Game Server 125 to be a prior art client executing a prior art game engine. Communication between Video Server System 120 and Game Server 125 optionally occurs via Network 115. As such, Game Server 125 can be a prior art multiplayer game server that sends game state information to multiple clients, one of which is game server system 120. Video Server System 120 may be configured to communicate with multiple instances of Game Server 125 at the same time. For example, Video Server System 120 can be configured to provide a plurality of different video games to different users. Each of these different video games may be supported by a different Game Server 125 and/or published by different entities. In some embodiments, several geographically distributed instances of Video Server System 120 are configured to provide game video to a plurality of different users. Each of these instances of Video Server System 120 may be in communication with the same instance of Game Server 125. Communication between Video Server System 120 and one or more Game Server 125 optionally occurs via a dedicated communication channel. For example, Video Server System 120 may be connected to Game Server 125 via a high bandwidth channel that is dedicated to communication between these two systems.

Video Server System 120 comprises at least a Video Source 130, an I/O Device 145, a Processor 150, and non-transitory Storage 155. Video Server System 120 may include one computing device or be distributed among a plurality of computing devices. These computing devices are optionally connected via a communications system such as a local area network.

Video Source 130 is configured to provide a video stream, e.g., streaming video or a series of video frames that form a moving picture. In some embodiments, Video Source 130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 125. Game Server 125 may maintain a copy of the state of the game based on game commands received from multiple players using geographically disperse clients. In these cases, the game state is provided by Game Server 125 to Video Source 130, wherein a copy of the game state is stored and rendering is performed. Game Server 125 may receive game commands directly from Clients 110 via Network 115, and/or may receive game commands via Video Server System 120.

Video Source 130 typically includes rendering logic, e.g., hardware, firmware, and/or software stored on a computer readable medium such as Storage 155. This rendering logic is configured to create video frames, to be included in the video stream, based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 130 includes a video recording device such as a camera. This camera may be used to generate delayed or live video that can be included in the video stream of a computer game. The resulting video stream, optionally includes both rendered images and images recorded using a still or video camera. Video Source 130 may also include storage devices configured to store previously recorded video to be included in a video stream. Video Source 130 may also include motion or positioning sensing devices configured to detect motion or position of an object, e.g., person, and logic configured to determine a game state or produce video-based on the detected motion and/or position.

Video Source 130 is optionally configured to provide overlays configured to be placed on other video. For example, these overlays may include a command interface, log in instructions, messages to a game player, images of other game players, video feeds of other game players (e.g., webcam video). In embodiments of Client 110A including a touch screen interface, the overlay may include a virtual keyboard, joystick, touch pad, and/or the like. In one example of an overlay a player's voice is overlaid on an audio stream. Video Source 130 optionally further includes one or more audio sources.

In embodiments wherein Video Server System 120 is configured to maintain the game state based on input from more than one player, each player may have a different point of view comprising a position and direction of view. Video Source 130 is optionally configured to provide a separate video stream for each player based on their point of view. Further, Video Source 130 may be configured to provide a different frame size, frame data size, and/or encoding to each of Client 110. Video Source 130 is optionally configured to provide 3-D video.

I/O Device 145 is configured for Video Server System 120 to send and/or receive information such as video, commands, requests for information, a game state, client identities, player identities, game commands, security information, audio, and/or the like. I/O Device 145 typically includes communication hardware such as a network card or modem. I/O Device 145 is configured to communicate with Game Server 125, Network 115, and/or Clients 110.

Processor 150 is configured to execute logic, e.g., software, included within the various components of Video Server System 120 discussed herein. For example, Processor 150 may be programmed with software instructions in order to perform the functions of Video Source 130, Game Server 125, and/or a Client Qualifier 160. Video Server System 120 optionally includes more than one instance of Processor 150. Processor 150 may also be programmed with software instructions in order to execute commands received by Video Server System 120, or to coordinate the operation of the various elements of Game System 100 discussed herein. Processor 150 may include one or more hardware device. Processor 150 is an electronic processor.

Storage 155 includes non-transitory analog and/or digital storage devices. For example, Storage 155 may include an analog storage device configured to store video frames. Storage 155 may include a computer readable digital storage, e.g. a hard drive, an optical drive, or solid state storage. Storage 155 is configured (e.g., by way of an appropriate data structure or file system) to store video frames, artificial frames, a video stream including both video frames and artificial frames, audio frame, an audio stream, and/or the like. Storage 155 is optionally distributed among a plurality of devices. In some embodiments, Storage 155 is configured to store the software components of Video Source 130 discussed elsewhere herein. These components may be stored in a format ready to be provisioned when needed.

Video Server System 120 optionally further comprises Client Qualifier 160. Client Qualifier 160 is configured for remotely determining the capabilities of a client, such as Clients 110A or 110B. These capabilities can include both the capabilities of Client 110A itself as well as the capabilities of one or more communication channels between Client 110A and Video Server System 120. For example, Client Qualifier 160 may be configured to test a communication channel through Network 115.

Client Qualifier 160 can determine (e.g., discover) the capabilities of Client 110A manually or automatically. Manual determination includes communicating with a user of Client 110A and asking the user to provide capabilities. For example, in some embodiments, Client Qualifier 160 is configured to display images, text, and/or the like within a browser of Client 110A. The displayed objects request that the user enter information such as operating system, processor, video decoder type, type of network connection, display resolution, etc. of Client 110A. The information entered by the user is communicated back to Client Qualifier 160.

Automatic determination may occur, for example, by execution of an agent on Client 110A and/or by sending test video to Client 110A. The agent may comprise computing instructions, such as java script, embedded in a web page or installed as an add-on. The agent is optionally provided by Client Qualifier 160. In various embodiments, the agent can find out processing power of Client 110A, decoding and display capabilities of Client 110A, network latency reliability and bandwidth of communication channels between Client 110A and Video Server System 120, a display type of Client 110A, firewalls present on Client 110A, hardware of Client 110A, software executing on Client 110A, registry entries within Client 110A, and/or the like.

Client Qualifier 160 includes hardware, firmware, and/or software stored on a computer readable medium. Client Qualifier 160 is optionally disposed on a computing device separate from one or more other elements of Video Server System 120. For example, in some embodiments, Client Qualifier 160 is configured to determine the characteristics of communication channels between Clients 110 and more than one instance of Video Server System 120. In these embodiments the information discovered by Client Qualifier can be used to determine which instance of Video Server System 120 is best suited for delivery of streaming video to one of Clients 110.

Video Server System optionally further comprises an Advertisement Source 165 configured to provide an object, such as an advertisement, to one or more of Clients 110. The functionality of the advertisement being dependent on whether the Client(s) 110 to which the advertisement is sent have been determined to be qualified to receive the video stream. In some embodiments, Advertisement Source 165 is disposed outside of Video Server System 120. For example, Advertisement Source 165 may be hosted and/or managed by a third party on a computer server connected to Network 115.

In some embodiments, the advertisement, or other object, provided by Advertisement Source 165 is configured to change functionality after having being delivered to Client 110B. The functionality is changed responsive to the qualification determination made by Client Qualifier 160, and can be changed by either an agent supplied to the client by Client Qualifier 160 and/or by logic included within the advertisement.

Changes to the functionality of the advertisement after delivery to Client 110B typically occurs after the advertisement has received notice that Client 110B is configured to receive a video stream. In some embodiments, the change in functionality includes changing a URL accessed when the advertisement is clicked. Then modified URL optionally includes data, such as bandwidth of a communication channel or a lag time, generated by Client Qualifier 160 during the qualification process. Changes to the functionality of the advertisement may or may not include changes to the appearance of the advertisement.

Advertisement Source 165 includes physical storage, such as a hard drive, as well as communication hardware configured to provide the advertisements to Clients 110. Advertisement Source 165 is optionally configured to provide objects other than advertisements, whose functionality changes as described herein. Advertisement Source 165 is optionally configured to store advertisements on Storage 155.

Figure 2:
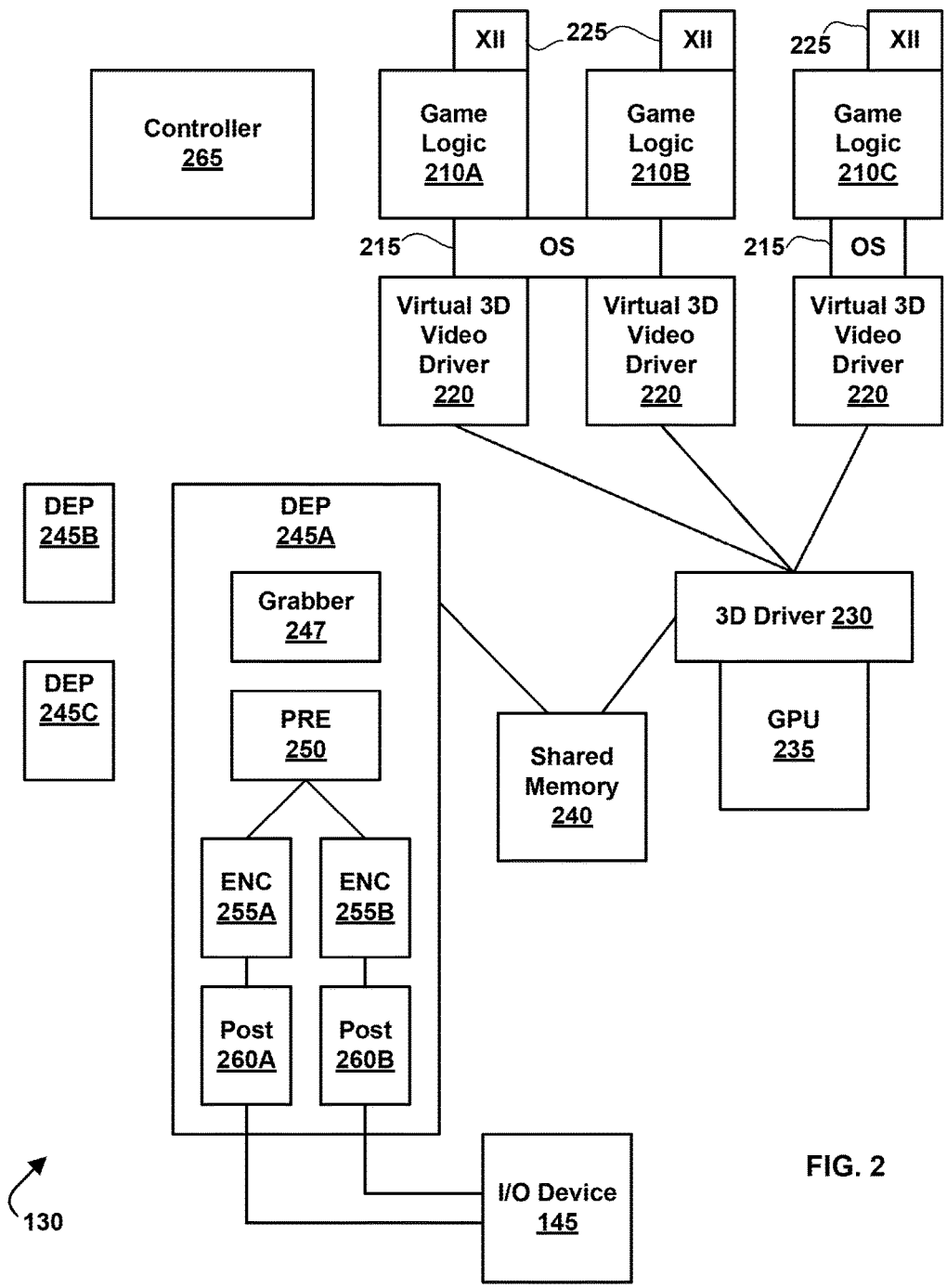
FIG. 2 is a block diagram of a video source configured to serve multiple video games, according to various embodiments of the invention.

FIG. 2 is a block diagram of embodiments of Video Source 130 configured to serve multiple video games. The multiple video games can include multiple instances of the same video game and/or instances of different video games. The video games are optionally multiplayer games. For example, a game state of one or more of the video games may be maintained by one or more instances of Game Server 125 each based on inputs received from multiple clients.

The video games are executed using different instances of Game Logic 210, individually labeled 210A, 210B, 210C, etc. Game Logic 210 is configured to use a game state to determine a game environment that can be rendered to a video stream configured to be presented to a game player. The game environment is a three dimensional virtual environment including in game objects, avatars, location of objects, their shapes, textures, and spatial relationships there between, and the like. A game environment can include vertex data, transformation data and texture data, and/or the like.

The rendering is typically based on one or more point of view associated with a specific game player. Video Source 130 may include more than 1, 2, 3, 5, 7, 15, or 31 instances of Game Logic 210. Game Logic 210 is optionally a client of Game Server 125 and may be configured to communicate with Game Server 125 via Network 115.

Game Logic 210 is configured to receive game commands from one or more of Clients 110 and to process the received commands according to a set of game rules. These rules cover, for example, how avatars interact with other avatars or in game objects, avatar movement, game instance management, and/or the like. Game Logic 210 includes hardware, firmware, and/or software stored on a computer readable medium.

Each instance of Game Logic 210 can be disposed on a separate computing device or several instances of Game Logic 210 could be disposed on the same computing device or a single instance of Game Logic 210 could be disposed across multiple computing devices. Game instances can dynamically change the number and/or identify of computing devices used depending on the requirements of the game environment the user is currently experiencing. Instances of Game Logic 210 disposed on the same computing device are optionally executed within separate virtual machines or virtual I/O shells. In some embodiments, different instances of Game Logic 210 are configured to communicate game commands and/or game state information directly to each other, e.g., without necessarily communicating through Game Server 125.

Game Logic 210 typically executes on top of an Operating System (OS) 215. Operating System 215 may include Windows™, Linux, Unix, Mac OS™, Solaris™, and/or the like may operate between Operating System 215 and Game Logics 210. Virtual machine platforms such as ESX, Hyper-V, and/or the like. In these embodiments, one or more of Game Logic 210 can be executed within a virtual machine. Multiple instances of Game Logic 210 may execute on the same instance of Operating System 215. For example, FIG. 2 illustrates Game Logic 210A and Game Logic 210B both executing on the same Operating System 215. Instances of Game Logic 210 executing on the same Operation System 215 may, or may not, be configured for playing the same video game. For example, Game Logic 210A, 210B and 210C may all be World of Warcraft® clients, or may be clients of World of Warcraft®, Eve® and Call to Arms® respectively.

In some embodiments, the game environments determined by Game Logic 210 are passed to an optional Virtual 3D Video Driver 220. Virtual 3D Video Driver 220 is configured to appear, from the point of view of Game Logic 210, as a non-virtual 3D video driver controlling a graphics processing unit. Each instance of Game Logic 210 may be associated with its own instance of Virtual 3D Video Driver 220, or Virtual 3D Video Driver 220 may be shared by two or more instances of Game Logic 210.

In alternative embodiments, Game Logic 210 is configured to include the functionality, as discussed herein, of Virtual 3D Video Driver 220. In these embodiments, Virtual 3D Video Driver 220 is not required. While not shown in FIG. 2 audio data determined by each Game Logic 210 may also be passed to a separate virtual audio driver.

Virtual 3D Video Driver 220 is further configured to pass the received game environments to a (non-virtual) 3D Driver 230. Optionally the delivery of game environments to 3D Driver 230 is coordinated by the various instances of Virtual 3D Video Driver 220. For example, delivery can be coordinated such that 3D Driver 230 receives game environments from only one or a minimum number of Virtual 3D Video Driver 220 at a time. In typical embodiments, each of Virtual 3D Video Driver 220 is configured such that they appear to be a separate process and a separate source of video data to 3D Driver 230. As such, 3D Driver 230 is configured to keep track of which video data results in which video frames after rendering.

The video data received by 3D Driver 230 are passed to Graphics Processing Unit (GPU) 235 for rendering into raw video frames. Graphics Processing Unit 235 is optionally used to render more than one video stream in parallel. For example, Graphics Processing Unit 235 may generate a first video stream based on video data received from Game Logic 210A, generate a second video stream based on video data received from Game Logic 210B, generate a third video stream based on video data received from Game Logic 210C, etc. in parallel. The parallel production of video streams includes the generation of these streams at the same time. However, parallel production of video streams may, but does not necessarily, include the processing of individual frames at the same time within Graphics Processing Unit 235. For example, in some embodiments 3D Driver 230 alternatively passes the video data generated by the various members Game Logic 210 to Graphics Processing Unit 235. Data generated by Game Logic 210A is used to make a video frame, and subsequently data generated by Game Logic 210B is used to make a video frame, etc. In this case, the video streams are produced in parallel while individual frames are produced in series. Alternatively, more than one video frame may be generated within Graphics Processing Unit 235 at the same time. In this case a first part of Graphics Processing Unit 235 is used to generate one frame while a second part of Graphics Processing Unit 235 is used to generate a second frame, the first and second frames arising from video data produced by different Game Logic 210. In some embodiments, one set of graphical computation cores is used to generate the first frame while a second set of graphical computation cores is used to generate the second frame, at the same time. The resulting video frames are passed back to the control of 3D Driver 230. In this regard, a core is a computation element of an electrical processor capable of performing specific simple tasks. A GPU can include a large number of cores specifically configured to perform graphics operations in parallel.

Virtual 3D Video Drivers 220 are typically configured manage the transfer of raw rendered video frames from 3D Driver 230. For example, Virtual 3D Drivers 220 may be used to coordinate the transfer of video frames from the control of 3D Driver 230 to a Shared Memory 240. (Following rendering, the video frames are in a memory of Graphics Processing Unit 235 or a memory managed by 3D Driver 230. In either case they are under the control of 3D Driver 230.) As Virtual 3D Video Drivers 220 manages the communication of video data and frames to and from 3D Driver 230, in some embodiments, they are capable of placing the video frames within parts of Shared Memory 240 associated with specific Dynamic Encoding Pipelines (DEPs) 245. The DEPs 245 are individually identified as DEP 245A, DEP 245B, DEP 245C, etc. In these embodiments, each DEP 245 is assigned specific memory locations within Shared Memory 240, and is configured to retrieve video data from those locations.

In other embodiments, Virtual 3D Drivers 220 are configured to manage the transfer of video data to Shared Memory 240 based on timing. In these embodiments, the transfers managed by each of Virtual 3D Drivers 220 are synchronized and the Virtual 3D Drivers 220 notify each DEP 245 when data for them is in Shared Memory 240. Once this data is retrieved by the notified member of DEPs 245, data for another member of DEPs is transferred from 3D Driver 230 to Shared Memory 240 under the control of Virtual 3D Video Drivers 220. In these cases pixel read back from the local GPU memory to Shared Memory 240 can be based on a schedule. As used herein the terms "in sync" and "synchronized" are meant to mean that the two events are related in time by a schedule, by a timing signal, by a time delay, or that one event does not start until the other event has satisfied a condition, e.g., has completed. For example, Virtual 3D Drivers 220 may operate in sync such that a game environment is provided to 3D Driver 230 from a first of Virtual 3D Drivers 220 once Graphics Processing Unit 235 has completed rendering of a game environment from a second of Virtual 3D Drivers 220. The timing of this synchronization is optionally selected to make optimum use of Graphics Processing Unit 235.

As a result of the management by Virtual 3D Video Drivers 220, the multiple video streams can be stored in Shared Memory 240 without confusing which frames belong to which video stream.

Shared Memory 240 includes random access memory (RAM) or a similar memory configured for efficient reading and writing of video data. Shared Memory 240 is configured to store video data for a plurality of different DEP 245. Video data for different DEPs 245 is optionally stored at the same time in Shared Memory 240. Shared Memory 240 may consist of a single hardware device or may include multiple devices.

DEPs 245 are dynamically allocated encoding pipelines that are each configured to encode video data rendered using Graphics Processing Unit 235. Each member of DEPs 245 is configured to encode to video formats specified at the time the DEP 245 is provisioned. This format specification is typically based on the needs of one of Clients 110 and/or the capabilities of the communication path between Video Server System 120 and the Client 110. DEPs 245 are optionally provisioned dynamically in response from a request from one of Clients 110. For example, when Client 110A connects to Video Server System 120 and sends a request for a video stream, DEP 245 can be provisioned to include elements, such as an encoder, selected specifically to meet needs of Client 110A. As is discussed elsewhere herein, a member of DEPs 245 is optionally configured to use more than one encoding scheme.

DEPs 245 each include a Grabber 247 configured to grab video data from Shared Memory 240 and transfer this video data to a memory of the DEP 245. The Grabber 247 is optionally under the control of a member of Virtual 3D Video Drivers 220. For example, in various embodiments, Grabber 247 is controlled by a member of Virtual 3D Drivers 220 to grab the video data from a specific location within Shared Memory 240 and/or at a specific time in synchronization with the transfer of video data to other members of DEPs 245. In some embodiments, Grabber 247 is also configured to grab 2D video data directly from Memory XII 225.

DEPs 245 each optionally also include a Preprocessor (PRE) 250. Preprocessor 250 is configured to perform a color space conversion such as RGB to YUV and/or a scaling operation to increase or decrease the resolution of the video frame. Preprocessor 250 is optional in embodiments wherein the output of Graphics Processing Unit 235 is in the YUV color space or some other desired color space. Multiple Preprocessor 250 may be included in a DEP 245 configured to produce multiple video streams having video frames of different sizes.

DEPs 245 each include at least one Encoder (ENC) 255. Encoders 255 are individually identified as Encoder 255A, Encoder 255B, etc. Each of Encoders 225 is configured to encode the video data according to a specific codec, and optionally a specific color depth and/or frame size. For example, Encoders 225 may be configured to encode video data to Adobe Flash® standard, .flv, .wav, .avi, .mpg, H.264, H.263, On2, VP6, VC-1, WMA, and/or other codecs discussed herein.

A member of DEPs 245 may include one, two or more Encoders 255. These encoders may be configured to encode to different codecs and/or the different formats of the same codec. For example. Encoder 255A may be configured to encode according to a Flash standard at a first frame size and color depth while Encoder 255 is configured to encode to the same Flash standard at a second frame size and color depth. The identity of Encoders 255 within each member of DEPs 245 is typically determined at the time the DEP 245 is provisioned. For example, a single command or command set may be used to create (provision) DEP 245A and specify which components the created DEP 245A should include. The creation of DEP 245A is discussed further elsewhere herein. A member of DEPs 245 including two or more Encoders 255 is alternatively viewed as two or more separate DEPs 245 having some but not all components in common. For example, DEP 245A and DEP 245B may have the same Preprocessor 250 but different Encoders 255.

In one example, Encoder 255A is configured to use a codec for H.264 while Encoder 255B is configured to use a codec for H.263. Having two or more different encoders available enables DEP 245A to change encoding during delivery of a video stream. The change in encoding can be from one type of encoding to another, or merely a change in characteristics of a specific type of coding. For example, the characteristics may change in terms of color depth, number of frames per second, encoding options, number of pixels, and/or the like. In some embodiments, DEP 245A is optionally configured to switch between Encoder 255A and 255B in response to a change in the characteristics of Client 110A or the communication channel between Client 110A and Video Source 130.

In practice, when a different codec other than that being used is required a new DEP 245 is spawned and executed in parallel with the current DEP 245 for a short period of time. The new DEP 245 is optionally a branch of the original DEP 245. For example, some components of the original DEP 245 may be used in the new DEP 245. These two DEP 245 may have components logically arranged in a tree structure.

In some embodiments, DEP 245 are configured to use two or more different encoders to generate two or more different video streams at the same time. These video streams are based on the same game environment rendered by Graphics Processing Unit 255 and, thus, include essentially the same materials (with the possible exception of overlays) and can be sent to different places. For example, one of the video streams can be sent to Client 110A while the other is sent to Client 110B. Alternatively, one of the video streams can be sent to Client 110A and the other to a website where third parties can watch the video. This website is optionally part of a social networking site or a game player's site. The two different video streams may be different in the frame rate, encoding type, frame size, color depth, etc. For example a video stream delivered to a social networking website can be of much lower quality than the video stream delivered to a game player who is playing a game using Client 110A. The second video stream may be directed to a game player who is playing the game or to people who are merely observing the game play. A video stream is optionally directed to more than one place.

DEP 245A optionally includes one or more Post Processors (Post) 260. Individual examples of Post Processors 260 are labeled 260A and 260B. Post Processors 260 are configured to package an encoded video frame in a container in a format appropriate for communication over a network according to a public or proprietary network protocol. For example, some protocols such as Adobe RTMP require post processing while other video standards such as H.264 Annex B do not require post processing. Each of Post Processors 260 may be associated with a specific member of Encoders 255, or several Post Processors 260 may be configured to receive encoded video frames from one member of Encoders 255.

The output of Post Processors 260 is directed to I/O Device 145 for delivery to one or more of Clients 110. The Elements of DEPs 245 discussed herein include hardware, firmware and/or software stored on a computer readable medium. For example, each of DEPs 245 may represent a set of software loaded into memory and executing using an electronic processor.

The operation of Video Source 130 is typically managed by a Controller 265. Controller 265 includes hardware, firmware and/or software stored on a computer readable medium. For example Controller 265 may include software stored in memory and executed using a microprocessor.

In some embodiments, Controller 265 is configured to provision instances of Game Logic 210A and Virtual 3D Video Driver 220 in response to a request to play a game. For example, if a request for a specific video game is received from Client 110A, Controller 265 may retrieve Game Logic 210A and Virtual 3D Video Driver 220 from Storage 155 and place these in working memory. Game Logic 210A may be placed in communication with both Client 110A and Game Server 125. Game Logic 210A is then executed using Processor 150 in order to play the video game.

In some embodiments, Controller 265 is configured to allocate instances of DEP 245 in response to a request to play a game. For example, Controller 265 may be configured to first determine or receive the requirements for DEP 245A and then provision computing instructions that satisfy those requirements. DEP 245A is then associated with one of Game Logic 210 and one of Virtual 3D Driver 220. The provisioned DEP 245A is optionally configured to retrieve raw video data from a specific area within Shared Memory 240.

In some embodiments the requirements for DEP 245A are determined by querying a user of Client 110A. For example, Controller 265 may be configured to cause text messages to appear on Client 110A, the messages requesting that a user of Client 110A enter characteristics of a video stream desired by a user. These characteristics can include a connection type, a frame size, an encoding scheme, a frame rate, a color depth, and/or the like. The entered characteristics are conveyed back to Controller 265, which then used these characteristics to select elements to include in DEP 245A when it is provisioned. For example, if the user requests a specific encoding scheme, then an Encoder 255 configured to use the requested encoding scheme is selected and included in DEP 245A.

In some embodiments the requirements for DEP 245A are determined automatically. For example, information gathered using Client Qualifier 160 in an Execute Agent Step 310 (See FIG. 3) can be used to determine the requirements for DEP 245A. In this example, if Client 110A includes only a Microsoft Silverlight® decoder and an Adobe Flash® decoder, then at least one of the corresponding encoder configurations or variants thereof is required in DEP 245A. Characteristics of the video stream to be generated using DEP 245A, such as frame size, color depth and frame rate, can also be determined by Controller 265 in this way.

The determination of requirements for DEP 245A may include both the use of characteristics provided by a user and characteristics automatically determined. In some embodiments, the possible characteristics are limited by a user's account type, payment and/or subscription. For example, a user may pay to receive a higher quality video stream.

Controller 265 may also manage sharing of Shared Memory 240. For example, Controller 265 may configure DEP 245A to use specific memory locations within Shared Memory 240 and/or Controller 265 may be configured to configured DEP 245A to access Shared Memory 240 in response to certain timing signals. The timing signals being timed for synchronization of access to Shared Memory 240 by different DEPs 245.

Figure 3:
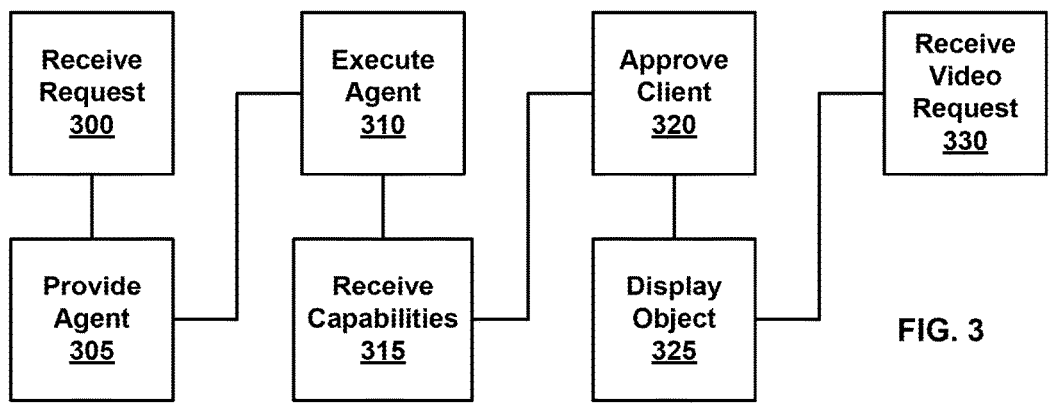
FIG. 3 illustrates methods of receiving a qualified request for a video stream from a client, according to various embodiments of the invention.

FIG. 3 illustrates methods of receiving a qualified request for a video stream from a client such as Client 110A, according to various embodiments of the invention. A qualified request, as the term is used herein, is a request that is received from a client, where the client has been qualified to received the video stream. The qualification means, for example, that the client meets a minimum level of decoding capability and/or that the communication channel between the client and Video Server System 120 meets minimum bandwidth and/or reliability requirements. In alternative embodiments, the request for a video stream is received from an unqualified client and the client is then qualified before the video stream is provided to the client.

In a Receive Request Step 300, a request is received to display an object on Client 110A. This object includes HTML, XML, text, an image, and/or the like, and is configured to indicate that a video stream is available for viewing on Client 110A. For example, the object may be a banner advertisement or some other type of link that indicates that a user can play a video game using Client 110A by clicking/selecting/cursor over the object. The request may be received as the result of the user loading a web page including a reference to the object. This reference can include a link, a universal resource locator, HTML, XML, and/or the like. For example, in some embodiments a first user chooses to include a link and image of a video game they play on their web page within a social networking website. When a second user visits this page information about the video game is displayed to the second user. As a result of computing instructions included within the web page, Video Server System 120 or some other part of Game System 100 receives a request to display text (an object) indicating that the second user can play the video game in a streaming mode by clicking on the object within the displayed information.

In some embodiments, the requested object is a banner advertisement and the request is received as a request for a web page in which the banner advertisement is embedded, or alternatively as a request for material at a location pointed to by a URL embedded in the web page. The banner advertisement typically includes information such as graphics or text regarding streaming video. The streaming video can be that of an interactive video game generated by Video Server System 120. The banner advertisement also includes a reference such as an Internet link or URL to a source or logic configured to provide the streaming video. such as that of a video game and includes. Typically this source is part of Video Server System 120.

The identity of the Video Server System 120 or Game System 100 that receives the request in Receive Request Step 300 is optionally dependent on the nature of the request. For example, a request may include a URL that references a particular game publisher and this request is directed to an embodiment of Game System 100 controlled or licensed to this game publisher. The request may come from a specific web page and the identity of that web page may be used to determine which entity receives the request.

In a Provide Agent Step 305, a software agent is provided to Client 110A from Video Server System 120. The software agent is configured for discovering capabilities of Client 110A and/or capabilities of the communication channel between Client 110A and Video Server System 120. The software agent is configured to be executed on Client 110A using an electronic processor. For example, the software agent may be configured to examine a registry on Client 110A, identify video decoders installed on Client 110A, identify characteristics of a display of Client 110A, identify an electronic processor of Client 110A, identify firewalls installed on Client 110A, identify other software or hardware on Client 110A, and/or the like. In some embodiments Client 110A is configured to test the communication channel between Client 110A and Video Server System 120 by sending and receiving data between Client 110A and Video Server System 120. This data may include test video frames. In some embodiments more than one path between Client 110A and Video Server System 120 is tested. The characteristics of the communication channels tested may include, ping time, network latency, jitter, bandwidth, reliability, and/or the like.

In some embodiments the software agent is configured to test communication channels between Client 110A and several different instances of Video Server System 120. In these embodiments, the software agent is capable of determining which of the communication channels is most capable of delivering a video stream to Client 110A from a member of the instances of Video Server System 120. As such, the software agent can determine which instance of Video Server System 120 is preferred for supplying the video stream.

In some embodiments the software agent includes computing instructions embedded in a web page. In some embodiments the software agent provided in Provide Agent Step 305 includes a browser plug-in. Provide Agent Step 305 is optional in embodiments where the software agent is already installed on Client 110A. In some embodiments, the software agent is a standalone program. The software agent is optionally part of an advertisement, such as a banner advertisement.

In an Execute Agent Step 310 the software agent provided in Provide Agent Step 305 is executed. The execution of the software agent may be automatic on delivery of the software agent to Client 110A, or the user loading the web page. The execution of the software is optionally manually initiated by the user. The software agent is executed using an electronic processor of Client 110A. The execution of the software agent is optionally initiated by a browser. The execution includes testing of communication channels and/or discovery of client capabilities as discussed herein. Execute Agent Step 310 is optionally initiated after an associated advertisement is displayed on Client 110A.

In an optional Receive Capabilities Step 315 the information discovered by the software agent is received by Client Qualifier 160. The information typically includes the capabilities and features of Client 110A as well as characteristics of one or more communication channel between Client 110A and one or more Video Server System 120. For example, after the execution of the software agent on Client 110A the information collected by the agent may be communicated to I/O Device 145 via Network 115. Receive Capabilities Step 315 is optional in embodiments in which the software agent executed in Execute Agent Step 310 changes functionality of the advertisement displayed on Client 110A, based on the discovered information, while executing on Client 110A. In these embodiments, all or part of Client Qualifier 160 is included in the software agent and the results of qualification tests need not be communicated back to other parts of Video Server System 120.

In an Approve Client Step 320, Client 110A is approved by Client Qualifier 160 for the purpose of receiving a video stream from Video Source 130. Approve Client Step 320 includes comparing the information received in Receive Capabilities Step 315 with a set of minimal requirements for the delivery of streaming video to Client 110A. These requirements can include minimum capabilities of Client 110A and/or minimum requirements for the connection between Client 110A and Video Server System 120. The approval is made only if the minimum(s) are met or exceeded. If the minimum(s) are not met or exceeded then Client 110A is not approved for receiving the video stream from Video Source 130. In some embodiments the minimal requirements for delivery of streaming video are selected so as to assure that the video is presented to a user with at least a desired level of quality. The minimal requirements are optionally dependent on the identity of the video game associated with the request or a publisher thereof.

In some embodiments, approval is for one or more of a plurality of alternative video streams. For example, the requirements of a lower bandwidth video stream may be satisfied while the requirements for a higher bandwidth video stream are not met. In this case, approval may be for the lower bandwidth video stream but not the higher bandwidth video stream. These alternative video streams can be based on the same or different video games and may include video of different image size and/or frame rate. For example, the video of some video games require a higher quality bandwidth than the video of other video games. Thus, Client 110A may be qualified for some video games but not others.

Approve Client Step 320 optionally includes identifying which of a plurality of alternative instances of Video Server Systems 120 is best suited to serve the streaming video to Client 110A. For example, the instance with the best communication channel between Client 110A and the Video Server Systems 120 may be selected. Criteria for determining which of Video Server Systems 120 is best suited to serve the streaming video are discussed elsewhere herein.

In some embodiments Client Qualifier 160 is configured to correct deficiencies in the capabilities of Client 110A. For example, Client Qualifier 160 can be configured to suggest to a user of Client 110A that a specific decoder be installed, or configured to automatically install a decoder. Client Qualifier 160 can also be configured to suggest to the user that hardware components of Client 110A should be upgraded. Client Qualifier 160 is optionally configured to suggest that the user connect Client 110A to Network 115 via a wired connection rather than a wireless connection. Client Qualifier 160 is optionally configured to identify if Client 110A is connected to Network 115 via a wireless connection.

Once a Client 110A is approved the approval may be stored, for example, on Client 110A or at Client Qualifier 160. If the approval is stored, then Client 110A is optionally preapproved the next time Receive Request Step 300 occurs and Steps 305-320 are optional. When Receive Request Step 300 occurs again, the stored approval is retrieved and used to determine that Client 110A has already been approved. The delivery of different video streams may require different capabilities of Client 110A and/or of the connection between Client 110A and Video Source 130. Therefore, a stored approval optionally includes information characterizing the type of video stream approved and/or the capabilities received in Receive Capabilities Step 315. In some embodiments, stored information is used to qualify the capabilities of Client 110A, but the connection between Client 110A and Video Server System 120 is retested.

In a Display Object Step 325, the object requested in Receive Request Step 300 is displayed to the user of Client 110A. In some embodiments, the object is only displayed after Client 110A has been successfully approved in Approve Client Step 320. In other embodiments the object is displayed but not fully functional until Client 110A has been successfully approved in Approve Client Step 320.

In other embodiments, the object is displayed prior to approval of Client 110A and functionality of the object is changed upon approval. The changed functionality typically includes changing what occurs when the object is selected by a user. For example, prior to approval the functionality may include directing a browser to a web page in which information about a video game is displayed or the user is offered an opportunity to download/purchase the video game. Following approval, the functionality may include starting a demo of the video game, the demo including delivering streaming video of the video game to Client 110A from Video Server System 120. As discussed elsewhere herein, there are optionally multiple levels of approval. The change in functionality may or may not be accompanied by a change in the appearance of the object as displayed on Client 110A.

In some embodiments, an advertisement is displayed on a web page prior to Approve Client Step 320, however, the functionality to which the advertisement is associated to is not fully activated. E.g., unlike a qualified advertisement, clicking on the advertisement will not result in delivery of a video stream to Client 110A. In these embodiments, delivery of the video stream is still only performed after Approve Client Step 320 is successfully completed and Client 110A is approved to receive the video stream. Changing the functionality of the advertisement optionally includes changing a link to which a browser is directed when the advertisement is clicked by a user.

As discussed elsewhere herein, in some embodiments, the object requested in Receive Request Step 300 includes a banner advertisement or other type of advertisement. The request is made by code embedded in a web page. When the web page is loaded in a browser of Client 110A a request is sent to Client Qualifier 160 and Client Qualifier 160 responds by performing steps 305-320 as needed. Following approval of Client 110A the banner advertisement is delivered to Client 110A and displayed on the web page in Display Object Step 325. Alternatively, the banner advertisement is delivered to Client 110A and its functionality is changed following approval of Client 110A.

In alternative embodiments Display Object Step 325 is performed prior to Execute Agent Step 310 and without Approve Client Step 320. In these embodiments, while the object is displayed it may not be fully functional and/or the actual delivery of the requested video stream is delayed until after Client 110A is approved in Approve Client Step 320. Thus, a video stream is still not provided to Client 110A until Client 110A is qualified to receive that video stream. This assures that the video stream will be seen by a user of Client 110A at least a minimum level of quality. Client 110A may be qualified for some video streams but not others.

In a Receive Video Request Step 330, a request for streaming video is received by Video Server System 120 from Client 110A. This request and the streaming video are optionally communicated via Network 115. In some embodiments, the request is received as a result of a user clicking on, cursor over or selecting the object displayed in Display Object Step 325. In typical embodiments the video stream is part of a video game played by the user of Client 110A. As such, the content of the streaming video is responsive to game rules and game commands entered by the user, and optionally users of other Clients 110. The request for streaming video may be in the form of a request by the user to play a video game in a streaming mode.

In various embodiments of the methods illustrated by FIG. 3 the object is provided to the client before the determination of whether the client is qualified to receive the streaming video is completed. In these embodiments the functionality of the object is change after delivery to the client. The appearance of the object may be unchanged, partly changed or completely changed when the functionality is changed.

In various embodiments, Receive Request Step 300 includes receiving a request for an advertisement received from a web page. In response an advertisement is provided to the client, e.g., Client 110A. This advertisement may include or be accompanied by the agent of Provide Agent Step 305 and Execute Agent Step 310. The advertisement is displayed on the client in Display Object Step 325. Execute Agent Step 310, Receive Capabilities Step 315 and/or Approve Client Step 320 are executed after the advertisement is displayed on the client. In Approve Client Step 320 it is determined that the client is, or is not, qualified to receive streaming the streaming video. Qualification is optionally a matter of degree. For example, qualification may be determined for video streams requiring different levels of bandwidth. Lower bandwidth streams may qualify while higher bandwidth streams do not qualify for a particular client.

In these embodiments, Approve Client Step 320 includes changing the functionality of the advertisement displayed on the client. The functionality of the advertisement is changed such that selection of the advertisement (e.g., clicking on the advertisement) by a user will result in providing the streaming video to the client in Receive Video Request Step 330. Prior to the change in functionality, selection of the advertisement would result in other actions such as navigation to another web page or delivery of a lower bandwidth video. The streaming video provided is optionally the highest quality (requiring greatest bandwidth) video, from among a plurality of alternative video streams, for which the client is approved in Approve Client Step 320.

Changing the functionality optionally includes changing an internet link or other address configured to be processed (e.g., navigated to) when the advertisement is selected by the client. The internet link can include a universal resource locator (URL). For example, a qualification parameter within a link including a URL may be changed. This qualification parameter represents the result of Execute Agent Step 310, Receive Capabilities Step 315 and/or Approve Client Step 320, and includes a Boolean qualification flag or a qualification level, and/or the like. Optionally, the functionality is changed by the agent on Client 110A, without requiring communication of qualification results between Client 110A and Video Server System 120.

In some embodiments, the appearance of the advertisement on the client is unchanged when the functionality is changed in Approve Client Step 320. In other embodiments, the appearance of the advertisement is partially changed. For example, as the client qualifies for progressively higher quality video a changing symbol representing the qualification can be presented on the advertisement. In other embodiments, the appearance of the advertisement is change completely.

Figure 4:
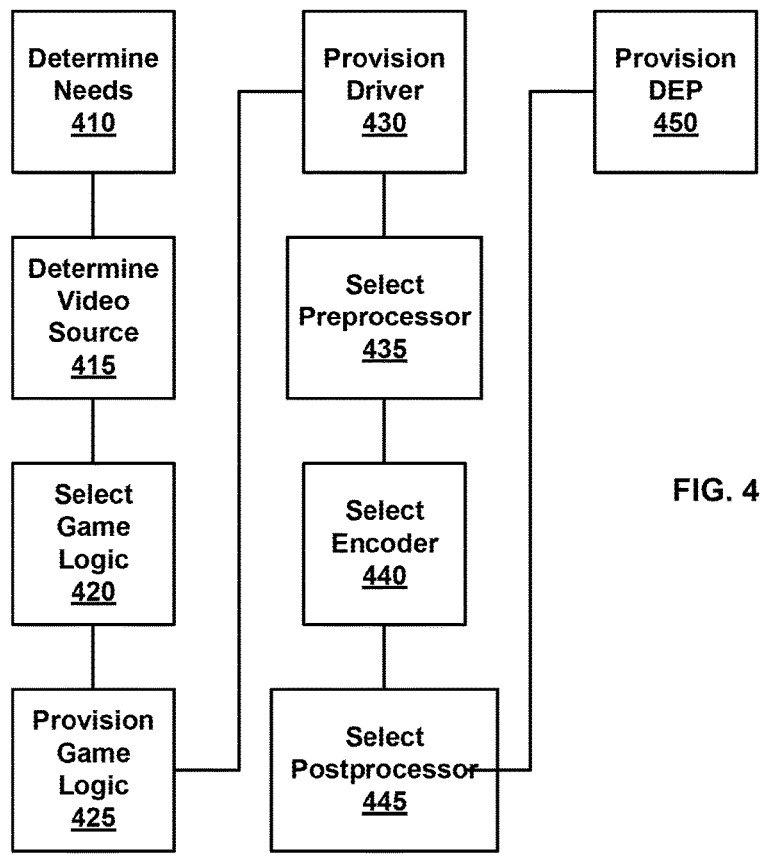
FIG. 4 illustrates methods of allocating resources within a video source, according to various embodiments of the invention.

In some embodiments, Video Server System 120 is configured such that the request received in Receive Video Request Step 330 causes game and video related resources to be allocated within Video Source 130. FIG. 4 illustrates methods of allocating these resources within a Video Source 130, according to various embodiments of the invention. These methods includes provisioning of Game Logic 210A and Virtual 3D Video Driver 220, and/or dynamic provisioning of DEP 245A. The methods illustrated by FIG. 4 are optionally performed using a system manager and a code source discussed elsewhere herein.

In a Determine Needs Step 410, the needs of Client 110A are determined. These needs may include a desired frame rate, frame size, color depth, encoding, minimum display latency, other needs discussed herein, and/or the like. The needs of Client 110A may be dependent on a particular video game played, for example some video games require a lower display latency or network latency between the time a game player makes a game command and the video the game player sees reflects the results of the game command, relative to other video games.

In some embodiments, the needs of Client 110A are dependent on selections made by a game player. For example, a player may select a specific frame size or set the size of a browser window that a frame should fill. In some embodiments, the needs of Client 110A are selected to simulate video that would be produced by specific hardware. For example, a game player may select to see video as would be produced by a specific nVidia or a specific AMD graphics card. In this case, the needs are typically specified to reflect the maximum performance of the selected device.

In some embodiments the needs of Client 110A are determined by accessing data received in Receive Capabilities Step 315 (FIG. 3) and optionally stored in Storage 155. This data is described elsewhere herein. The needs of Client 110A are then selected so as to match the capabilities of Client 110A. For example, if Client 110A includes an Adobe Flash decoder then one of the needs may be a video stream encoded in Adobe Flash. If communication to Client 110A has a limited bandwidth, one of the needs may be a limit on the frame size that can be transmitted to Client 110A.

In some embodiments, Determine Needs Step 410 includes providing an agent to Client 110A, executing that agent and receiving capabilities of Client 110A. This approach may include performing embodiments of Provide Agent Step 305, Execute Agent Step 310 and Receive Capabilities Step 315 (FIG. 3).

In some embodiments, Determine Needs Step 410 includes reading a cookie, IP address, or other identifying information on Client 110A. This identifying information is then used to look up previously stored needs for Client 110A. For example, if the needs of Client 110A were previously determined, these needs can be stored in a database in, for example, Storage 155 or some location remote from Video Server System 120. The identifying information can then be used to retrieve these stored needs. Determine Needs Step 410 optionally includes both retrieving stored information and performing some tests on Client 110A. For example, information regarding software available on Client 110A may be stored while the connection between Client 110A and Video Source 130 may be tested again.

In some embodiments, Determine Needs Step 410 is dependent on minimum requirements set by a provider of a video game. For example, a game publisher may specify that a video stream be provided at least a minimum resolution and/or quality of service. This enables a game publisher to assure that a game demo meets minimum standards.

In a Determine Video Source Step 415 a Video Source 130 is selected for providing streaming game video to Client 110A. The selected Video Source 130 is typically selected from among a plurality of Video Sources 130. This plurality may include Video Sources 130 located at the same location or geographically distributed. The selection is based, in part, on the ability of the Video Source 130 to meet the needs of Client 110A as determined in Determine Needs Step 410. For example, if a first Video Source 130 can provided streaming video with a lower display latency relative to a second Video Source 130, the first Video Source 130 may be more likely to be selected. Further details relating to the selection of Video Sources 130 are discussed elsewhere herein. For example, in relation to FIG. 7.

In a Select Game Logic Step 420 an instance of Game Logic 210 is selected for inclusion in the Video Source 130 selected in Select Video Source Step 415. The Game Logic 210 is typically selected based on which video game the game player wishes to play. The Game Logic 210 may also be selected based on the needs of Client 110A. For example, if Client 110A includes a touch screen interface, a version of the video game (Game Logic 210) configured for use with a touch screen interface may be selected over a version configured for a keyboard interface. In some embodiments, a demo or introductory version of a video game may be selected over a full version responsive to a user's account status, e.g., a user making a payment. An instance of Game Logic 210 is optionally selected based on a need for a specific video frame aspect ratio. Different instances of Game Logic 210 may be configured for the generation of video frames having different aspect ratios.

In a Provision Game Logic Step 425 the Game Logic 210 selected in Select Game Logic Step 420 is provisioned onto the Video Source 210 selected in Determine Video Source Step 415. Provision Game Logic Step 425 typically includes copying computing instructions included within Game Logic 210 from Storage 155 or from a code source external to Video Server System 120 to working memory of Video Source 130. Provision Game Logic Step 425 is optional where the selected Game Logic 210 is already provisioned on the selected Video Source 130.

In a Provision (Virtual 3D Video) Driver Step 430 in instance of Virtual 3D Video Driver 220 is provisioned to the instance of Video Source 130 selected in Determine Video Source Step 415. The Virtual 3D Video Driver 220 is typically retrieved from Storage 155 and copied to working memory of Video Source 130. The Game Logic 210 provisioned in Provision Game Logic Step 425 and the Virtual 3D Video Driver 220 are also linked together (e.g., a memory address of Virtual 3D Video Driver 220 is provided to Game Logic 210) such that the game environment output of Game Logic 210 is directed toward the Virtual 3D Video Driver 220.

In an optional Select Preprocessor Step 435 one or more Preprocessor 250 are selected based on the needs of the Client 110 as determined in Determine Needs Step 410. The selection may also be based on the type of output of the Graphics Processing Unit 235 included within the selected Video Source 130. Select Preprocessor Step 435 is optional wherein raw graphic provided by Graphics Processing Unit 235 is directly compatible with an encoder.

In a Select Encoder(s) Step 440, one or more video Encoders 255 are selected for inclusion in Video Source 130. One of these Encoders 255 is typically a preferred video encoder based on the video needs of the client. Others of these encoders may be backup Encoders 255 in case there is a need to change encoding during delivery of a video game. For example, a preferred Encoders 255 may produce a higher quality video stream than a backup Encoders 255 but the backup Encoders 255 may require less bandwidth for delivery of video to Client 110A. Typically, the selection of Encoders 255 will be based on at least the video decoders available on Client 110

In an optional Select Postprocessor(s) Step 445, one or more Postprocessors 445 are selected for inclusion in Video Source 130. The selection is dependent on what further processing/packaging the output of the Encoders 255 selected in Select Encoder(s) Step 440 require.

In a Provision DEP Step 450 a Dynamic Encoding Pipeline (DEP 245A) is provisioned in Video Source 130 using the Preprocessor 250, Encoders 255 and/or Postprocessors 260 selected in the previous steps. Provision DEP Step 450 includes linking these elements together such that they can pass access to video data received from Shared Memory 240 and/or Graphics Processing Unit 235. For example, in some embodiments memory addresses are provided to these elements so they can retrieve video data from Shared Memory 240 and then operating on that video data in a Heap within DEP 245A. This step may be performed under the control of Controller 265.

Provision DEP Step 450 typically includes copying copies of the provisioned elements from Storage 155 or from a code source discussed elsewhere herein. If more than one Encoder 255 is selected in Select Encoder 440, just the preferred Encoder 255 or alternatively more than one Encoder 255 may be initially provisioned in Provision DEP Step 450. If only one encoder is initially provisioned additional encoders may be provisioned at a later time. DEP 245A is optionally configured in a tree structure. For example, one Preprocessor 250 may provide video frames to one or more Encoders 255 and each of Encoders 255 may provide video frames to one or more Postprocessors 260.

In some embodiments, the creation of DEP 245A in Provision DEP Step 450 includes receiving a command. This command includes parameters specifying the elements to include in DEP 245A. Typically, a DEP 245 is not allocated and provisioned until needed by a specific Client 110 at which time it is provisioned for that client.

Figure 5:
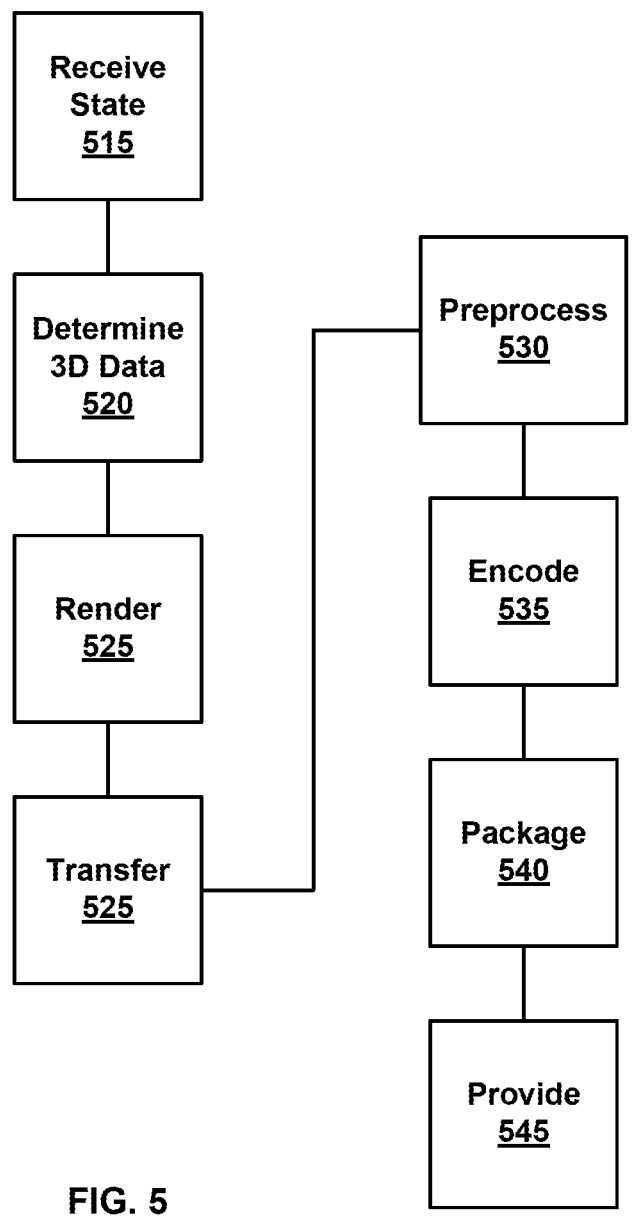
FIG. 5 illustrates methods of serving multiple video games, according to various embodiments of the invention.

FIG. 5 illustrates methods of serving multiple video games, according to various embodiments of the invention. In these methods Video Source 130 supplies multiple video streams to multiple destinations. These video streams are based on game environments generated by Game Logic 210 and are rendered using shared Graphics Processing Unit 235. The steps illustrated in FIG. 5 may be performed in parallel to generate the multiple video streams. For example, Game Logic 210A, Game Logic 210B and Game Logic 210C may each be generating game environments for rendering and the resulting video streams can be sent to different game Clients 110. The operation of these Game Logic 210 may or may not be coordinated. For example, in some embodiments the Game Logic 210 are synchronized so as to produce game environments at different times so that Graphics Processing Unit 235 can render each game environment as quickly as possible.

In a Receive State Step 515, one or more game states are received by Game Logic 210. Each game state is directed to a different member of Game Logic 210. For example, if Video Source 130 is configured to execute a client (Game Logic 210) for World of Warcraft® using Game Logic 210A and a client for Grand Theft Auto® using Game Logic 210B, then game states for each of these games are received and directed to the respective Game Logic 210. Each of the game states are representative of a state of the respective video games.

The game states can be received from Game Server 125 or from a storage location within Video Source 130. In some embodiments, the receive game states are the result of game commands received by Game Logic 210A and Game Logic 210B and passed on to one or more Game Server 125, and/or the result of game commands received by Game Server 125 from other game players. In various embodiments a received game state represents a saved game or a game state updated locally to Video Source 130.

In a Determine 3D Data Step 515, the game states received by instances of Game Logic 210 are each used to determine a separate first three-dimensional game environment based on the game state and a player point of view. The game environments are determined using rules of the game as defined by each Game Logic 210. Each game environment is passed to a Virtual 3D Video Driver 220.

In a Render Step 520, the one or more three-dimensional game environments generated in Determine 3D Data Step 520 are rendered to video data. This rendering is performed using shared Graphics Processing Unit 235. In some embodiments, the rendering of each three-dimensional game environments are done in parallel. For example, different game environments may be processed by different parts of Graphics Processing Unit 235 at the same time, or Graphics Processing Unit 235 may be configured to process different game environments in different time slices. These time slices may or may not be long enough to generate a single video frame.

In some embodiments, game environments are provided to Graphics Processing Unit 235 in a synchronized manner such that Graphics Processing Unit 235 can process one or a limited number of game environments at the same time. The synchronization can be accomplished by communication between members of Game Logic 210, or by control of Virtual 3D Video Drivers 220. For example, Virtual 3D Video Drivers 220 may be configured to report back completed processing of game environments to each of Game Logic 210 in a synchronized manner such that the next game environment is provided from each of Game Logic 210 at the best time. This synchronization is optionally managed by Controller 265. The result of Render Step 520 is typically a separate frame of raw video data for each receive game environment.

In a Transfer Step 525, the raw video data generated by Graphics Processing Unit 235 is transfer to Shared Memory 240. This transfer is optionally performed under the control of Virtual 3D Video Drivers 220. The raw video data is optionally transferred to specific memory locations within Shared Memory 240 assigned to specific DEP 245. Alternatively, the raw video data is transferred at specific times assigned to specific DEPs 245. For example, each of Virtual 3D Video Driver 220 may be configured to control access by an assigned member of DEPs 245 to Shared Memory 240 such that the member of DEPs 245 receives the correct video stream.

In an optional Preprocess Step 530, the raw video data generated by Graphics Processing Unit 235 and received by DEP 245A is preprocessed using Preprocessor 250. Preprocessing Step 530 typically includes the conversion of the raw video data from RGB data to YUV data. Preprocess Step 530 is optional in embodiments wherein the raw video data generated using Graphics Processing Unit is compatible with Encoder(s) 255. For example, if Graphics Processing Unit is configured to generate YUV data directly. Multiple instances of Preprocess Step 530 are optionally performed in parallel within different DEP 245 on different video streams generated by Graphics Processing Unit 235. Preprocessing Sep 530 optionally further comprises changing a frame size of the raw video data.

In an Encode Step 535, one or more Encoders 255, e.g., the preferred Encoder 255, are used to encode the video data generated by Graphics Processing Unit 235 and optionally processed using Preprocessor 250. The encoding is to one or more specific codec. In Encode Step 535 video data generated using Graphics Processing Unit 235 is optionally encoded to more than one codec or to more than one frame size, color depth, or other video characteristic. For example, Encoder 255A may be configured to encode according to one codec at a first frame size while Encoder 255B is configured to encode according to a second codec at a different frame size.

In an optional Package Step 540, the encoded video frame generated in Encode Step 535 is packaged for communication to a Client 110, if needed.

In a Provide Step 545, the video frame encoded in Encode Step 535 and optionally packaged in Package Step 540 is provided to one or more Client 110 over Network 115 as part of a video stream. This video frame may also be provided to other destinations. For example, a copy of the video stream may be delivered to a website, a storage location, a social networking site, an advertisement, and/or the like.

The steps illustrated in FIG. 5 are optionally performed in different orders and may be repeated with variations. For example, Encoder 255A may be used in one instance of Encode Step 535 while Encoder 255B is used in another instance of Encode Step 535. This change may occur during delivery of a video stream. Encoder 255A and Encoder 255B optionally communicate in order to maintain a sequence numbering of the video frames within the video stream. Reasons for changing encoding or other characteristics of the video stream are discussed elsewhere herein.

Figure 6:
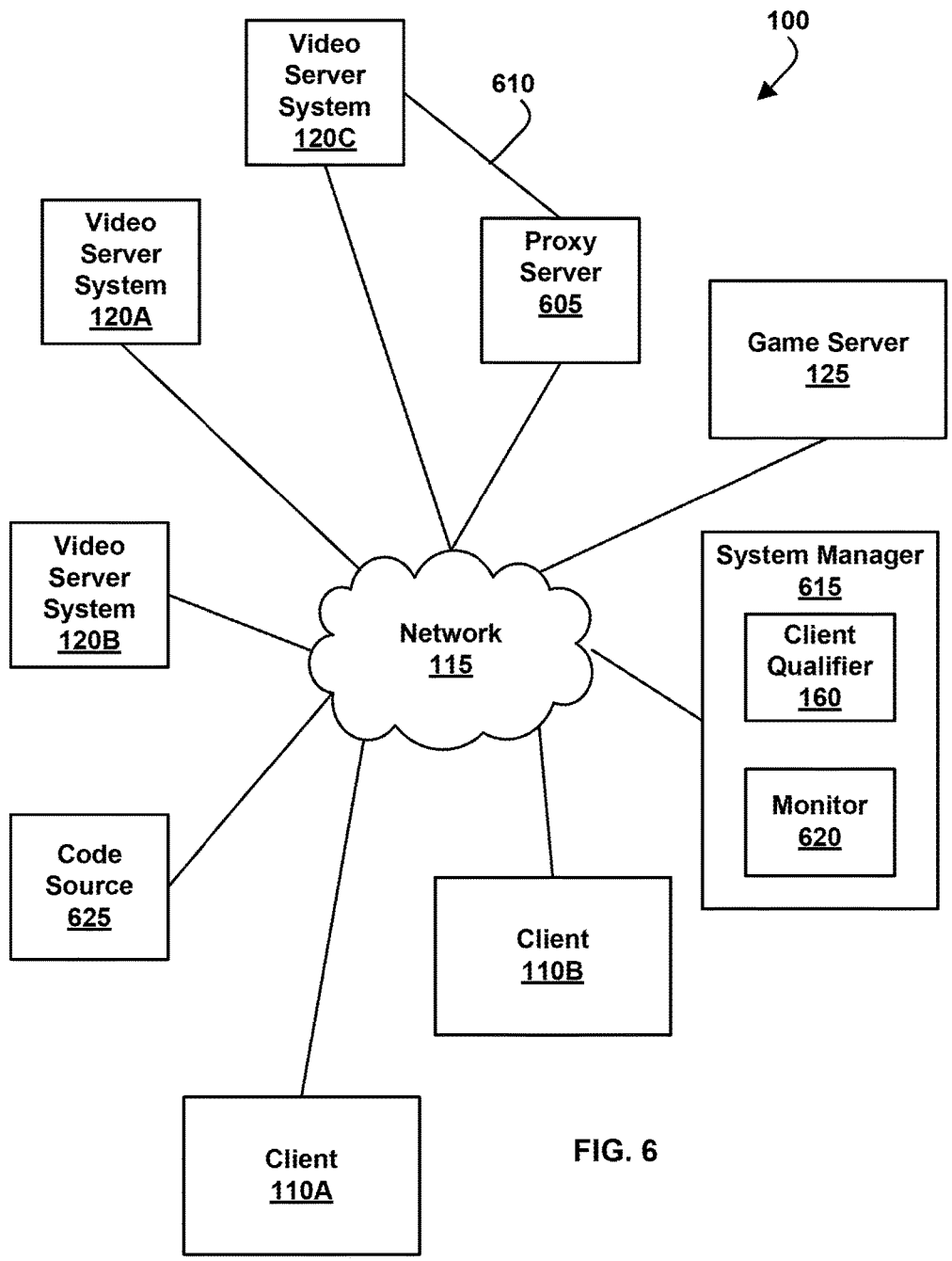
FIG. 6 illustrates a game system including more than one video server system, according to various embodiments of the invention.

FIG. 6 illustrates various embodiments of Game System 100 including more than one Video Server Systems 120. These Video Server Systems 120 are individually identified as 120A, 120B, 120C, etc. Game System 100 can include at least 1, 2, 3, 5, 10, 25, 50, 100 or 500 instances of Video Server System 120. These embodiments of Game System 100 further include a System Manager 615 configured to manage the use and operation of Video Server Systems 120. These embodiments of Game System 100 optionally also include a Code Source 625 configured to provide game code to Clients 110 at the same time these Clients 110 are receiving streaming video.

The members of the Video Server Systems 120 illustrated in FIG. 6 are typically geographically dispersed. For example, Video Server System 120A may be located in San Jose Calif., Video Server System 120B may be located in Tokyo, and Video Server system 120C can be located in New York City. The geographic distribution of Video Server Systems 120 allows Clients 110 to receive video streams over a shorter geographic distance that would occur if all of Video Server Systems 120 were located in the same place. To the extent that geographic distance is related to the time required to communicate between one of Clients 110 and one of Video Server Systems 120, reducing the geographic distance reduces the latency of this communication.

Each of Video Server Systems 120 are optionally configured to provide multiple video streams to multiple Clients 110. These video streams can arise from different video games and/or multiple instances of the same video game. Different members of Video Server Systems 120 may be configured to provide streaming video from different sets of video games. For example, Video Server System 120B may be configured to generate video streams arising from 20 instances of World of Warcraft® and 15 instance of Mortal Combat®, while Video Server System 120B be configured to generate video streams arising from 20 instance of World of Warcraft and 25 instances of Spore®.

In various embodiments, Video Server Systems 120 are configured to communicate with Clients 110 and optionally one or more Game Servers 125 via Network 115. Typically Network 115 includes the internet or other public network that carries network traffic other than that related to the output of Video Server Systems 120. Members of Video Server Systems 120 optionally communicate through a Proxy Server 605 and a Dedicated Connection 610. Proxy Server 605 is a network server that is configured to appear to be one of Video Server Systems 120 from the point of view of Clients 110, and vice versa. The purpose of Proxy Server 605 is to forward received messages, e.g., from Client 110A to Video Server System 120C and from Video Server System 120C to Client 110A. The advantage of using Proxy Server is that part of the communication can occur over Dedicated Connection 610. Dedicated Connection 610 can have a high bandwidth dedicated to this communication. In one example, Proxy Server 605 and Client 110A are both located in Amsterdam. Dedicated Connection 610 is configured to enable high bandwidth communication between Proxy Server 605 and Video Server System 120C in New York City. Communication between Video server System 120C and Client 110A occurs by first communicating between Video Server System 120C and Proxy Server 605 via Dedicated Connection 610, and then by communicating between Client 110A and Proxy Server 605 via Network 115. The use of Proxy Server 605 can allow a game player in New York to play on the same member of Video Server Systems 120 as a game player in Amsterdam.

System Manager 615 includes hardware, firmware, and/or software stored on a computer readable medium. For example, System Manager 615 can include an internet server having storage, an electronic processor, and software configured to operate the electronic processor so as to perform actions discussed herein. System Manager 615 may be located at a same location as one of Video Server Systems 120 or at a separate location. Typically, System Manager 615 includes at least an embodiment of Client Qualifier 160 and a Monitor 620.

The embodiment of Client Qualifier 160 within System Manager 615 is configured to qualify Clients 110 based on the capabilities of the Clients 110 and the connections between Clients 110 and Video Server Systems 120. When multiple Video Server Systems 120 are available to provide video to Client 110A, Client Qualifier 160 optionally includes computer instructions configured to first determine a geographic location of Client 110A based on mapping of the IP (internet protocol) address. This mapping is then used to identify one or more of Video Server Systems 120 in geographic proximity to Client 110A. Following the identification of nearby sources of streaming video, the communication channels between the identified members of Video Server Systems 120 are tested using further computing instructions of Client Qualifier 160. This testing is further described elsewhere herein. Client Qualifier 160 is further configured to use the results of these tests to determine which of the Video Server Systems 120 is best qualified to delivery streaming video to Client 110A.

Monitor 620 is configured to manage Video Server Systems 120. For example, Monitor 620 can track the usage and capacity of each of Video Server Systems 120. This can include the geographic location of each of Video Server Systems 120, the number of video streams provided by each, the total amount of video data provided by each, the percentage of GPU and CPU cycles that are used, the amount of storage available, temperature, fan speed, hard drive and memory usage, network card usage, and/or the like. Monitor 620 can also track which games are provisioned on which of Video Server Systems 120 and how much each game is played. In some embodiments, Monitor 620 is configured to provision members of Video Server Systems 120 with Game Logic 210, Encoders 255, and/or other software needed to provide video streams associated with specific games. Monitor 620 may also be configured to manage assignment of a specific member of Video Server Systems 120 to provided streaming video to a specific member of Clients 110, based on testing performed by Client Qualifier 160. This assignment can include reassignment from one member to another member of Video Server Systems 120. Reassignment is desirable under conditions discussed elsewhere herein.

Code Source 625 is configured to provide computing instructions to Video Server Systems 120, Video Source 130, Clients 110, and/or other elements of Game System 100. For example, Code Source 625 may be configured to provide Game Logic 210, Preprocessor 250, Encoder 255, Postprocessor 260, Operating System 215, a software agent for testing the capabilities of Client 110, and/or the like. Code Source 625 may also be configured to provide game code to Clients 110 as a background process as streaming video is being provided to these Clients 110. In typical embodiments, Code Source 625 includes a storage device such as a hard drive, a file server, a flash memory, an optical storage, or other device configured to store computing instructions. Code Source 625 is optionally configured to communicate with other parts of Game System 100 via Network 115.

Figure 7:
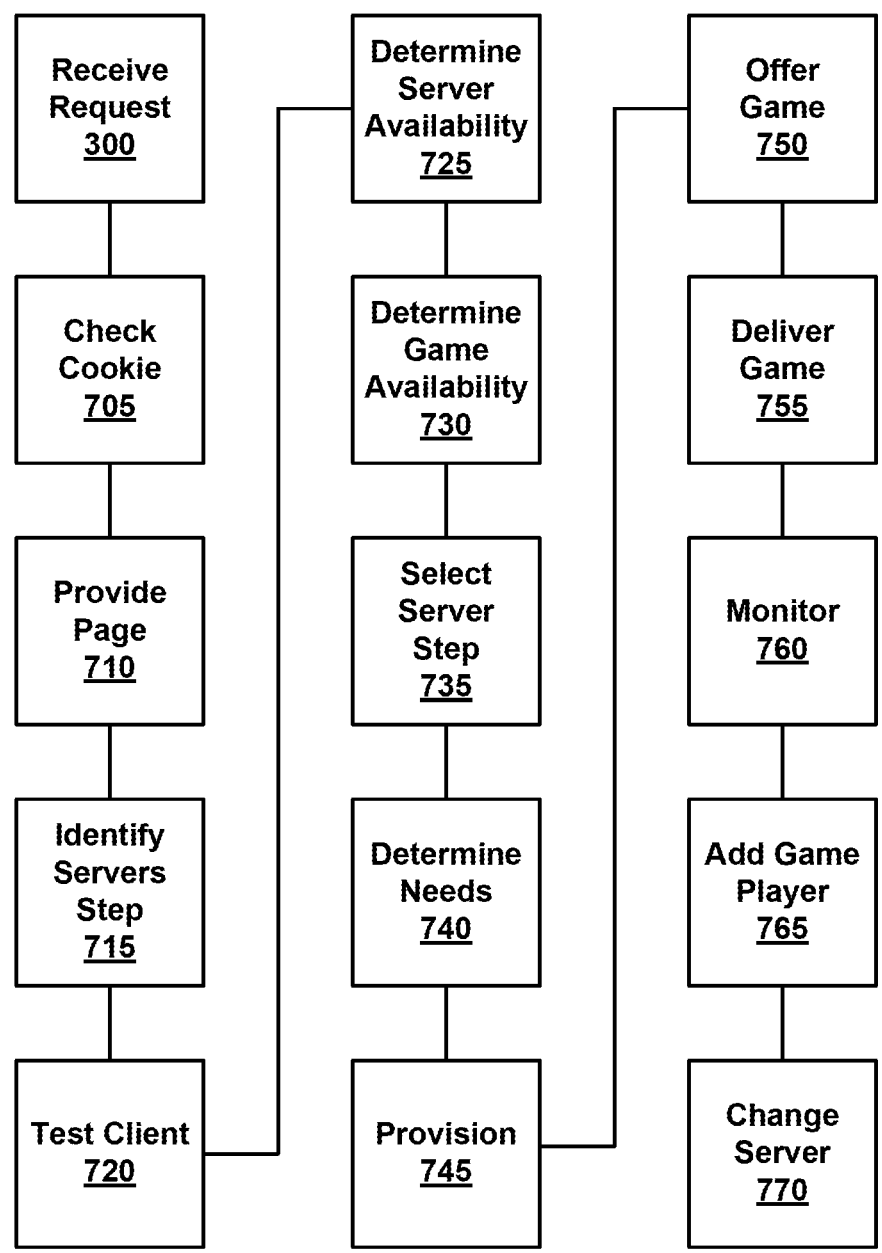
FIG. 7 illustrates methods of providing a video stream to a qualified client, according to various embodiments of the invention.

FIG. 7 illustrates methods of providing a video stream to a qualified client, according to various embodiments of the invention. In this method one of Clients 110, e.g., Client 110A is qualified to receive video, based on the qualification a user of Client 110A is given an opportunity to request the video, and upon receiving the request streaming video is provided. The method is optionally performed using Game System 100. For example, the steps illustrated in FIG. 7 can be managed by System Manager 615 and/or Controller 265. While the steps illustrate in FIG. 7 are explained with reference to delivering a video stream to a single instance of Client 110. In alternative embodiments, the video stream may be delivered to multiple Clients 110. In these embodiments, various steps such as tests may be performed with respect to each of the multiple Clients 110. The steps illustrated in FIG. 7 may also be adapted to the delivery of audio streams.

The methods illustrated in FIG. 7 start with Receive Request Step 300 described elsewhere herein, e.g., with respect to FIG. 3. In this step a request is received to display an object on Client 110A. This object is configured to give a game player an opportunity to request to receive a streaming video as part of playing a video game. The request could be for a specific video game, any of a class of video games, a "game of the day," a game undergoing a sales promotion, the identity of a web page on which the object is displayed, or any video game. The request is optionally received at System Manager 615 or one of Video Server Systems 120.

In an optional Check Cookie Step 705, Client 110A is examined for a browser cookie, an IP address, and/or other identifying information. If this information is found it is used to retrieve previously determined information regarding Client 110A. For example, if characteristics and needs of Client 110A have already been determined and stored, the identifying information is used to retrieve the stored characteristics and needs. The information may be stored on System Manager 615 or one of Video Server System 120. The retrieval of previously stored information may eliminate the need to perform some or all tests in order to qualify Client 110A to receive the object requested in Receive Request Step 300.

In an optional Provide (Web) Page Step 710 a web page is provided to Client 110A. This page may or may not have the requested object included therein depending on the particular embodiment of the invention. If the requested object is included it is typically not fully functional.

In an Identify Servers Step 715 one or more Video Server Systems 120 are identified as potential candidates for providing streaming video to Client 110A. The identification of these servers may be based on their proximity to Client 110A. For example, an IP address of Client 110A may be mapped in order to determine its approximate location. The identification of these servers may also be based on an initial ping test between the various Video Server Systems 120 and Client 110A. The identification of these servers may also be based on the available capacity of Video Server Systems 120. For example, an instance of Video Server Systems 120 may not currently have capacity to deliver the streaming video to Client 110A. In this case this instance of Video Server Systems 120 is not considered as a candidate. It may occur that no Video Server Systems 120 are identified as candidates for providing streaming video to Client 110A. In this case, Client 110A cannot be qualified to receive the streaming video and the method is halted.

In a Test Client Step 720, Client 110A and the connections between Client 110A and the various Video Server Systems 120 identified as candidates in Identify Servers Step 715 are tested. Test Client Step 720 can include Provide Agent Step 305, Execute Agent Step 310 and Receive Capabilities Step 315, as described elsewhere herein. The tests made in Test Client Step 720 are optionally performed using Java® code. This code can be included in a browser plug in or embedded in a web page. For example, in some embodiments, the testing is performed just using Java code embedded in a web page.

The testing performed in Test Client Step 720 can include: latency tests such as the time required to communicate between Client 110A and each of the candidate Video Server Systems 120; bandwidth tests based on, for example, HTTP or UDP; tests of the CPU on Client 110A, tests configured to determine the availability of plug-ins on Client 110A (plug-ins can include testing agents, decoders, or the like); tests configured to determine the operating system running on Client 110A; tests configured to determine the types of devices included in or attached to Client 110A, such as display devices or graphics processing units; tests configured to determine the size and aspect ratio of an area on Client 110A on which streaming video is to be displayed; tests configured to determine a maximum packet size that can be transmitted to Client 110A without being split (e.g., a maximum transmission unit); tests configured to determine if a Wifi connection is included in the communication channels between Client 110A and each of the candidate Video Server Systems 120; and tests configured to determine the reliability (e.g., jitter, packet loss and variation in bandwidth) between Client 110A and each of the candidate Video Server Systems 120.

The tests performed in Test Client Step 720 are optionally performed over multiple web page loads. These can occur over time, e.g., over days. In order to perform tests over time identification information, such as that identified in Check Cookie Step 705 is used to associate previous test data with new test data. For example, some reliability testing of communication channels between Client 110A and candidate Video Server Systems 120 may occur each time a game player interacts with Game System 100 and the results of these tests can then be combined to create a statistically reliable estimate of the reliability. Tests that do not take significant time, e.g., ping tests, are typically performed on a single page load. While tests that take more time, e.g., bandwidth and reliability tests, are optionally performed over several page loads or several instances of Test Client Step 720. Old test data is optionally allowed to expire such that testing reflects current conditions of Client 110A. Test Client Step 720 is optionally performed, in part, after delivery of streaming video to Client 110A has begun.

In a Determine Server Availability Step 725 the availability of the candidate Video Server Systems 120 identified in Identify Servers Step 715 to provide the streaming video are determined. This available may be dependent on resources available on each Video Serving System 120. For example, whether sufficient Processor 150 or Graphics Processing Unit 235 capacity is available. If the request received in Receive Request Step 300 is directed toward a specific video game, then Determine Server Availability Step 725 can include confirming that the candidate Video Serving Systems 120 are configured to provide streaming video from that specific video game. An instance of Video Serving Systems 120 may be provisioned with required Game Logic 210 if needed.

In a Determine Game Availability Step 730 the availability of a specific video game is determined. If the request received in Receive Request 300 is directed toward a specific video game then the availability of that game is determined. Otherwise, the availability of several games may be determined until an available game is found. Game availability may also be dependent on licensing of game code from a publisher or a game promotion program.

The availability of a specific video game may be dependent on test results generated in Test Client Step 720. For example, some video games require a greater amount of bandwidth and or shorter ping time than other video games. Optionally, if the tests results show that a computer game cannot be delivered with a minimum level of quality then that game is not available to Client 110A, at this time. A game player using Client 110A, a manager of Game System 100, and/or a publisher of a video game may determine the minimum level of quality. The minimum level of quality can include several parameters such as display latency, bandwidth, reliability, and frame size.

In a Select Server Step 735 one of the candidate Video Serving Systems 120 is selected to provide the video game, as streaming video, to Client 110A. This selection is based on the results of Test Client Step 720, Determine Server Availability Step 725, and/or Determine Game Availability Step 730. Typically the Video Serving System 120 best able to provide the streaming video to Client 110A is selected. Select Server Step 735 optionally includes temporarily reserving capacity (memory, CPU and GPU, etc.) on the selected Video Server System 120. This assures that the required resources are available if the video stream is actually delivered. Select Server Step 735 is an alternative embodiment of Determine Video Server Step 415 (FIG. 4).

In a Determine Needs Step 740 the needs of Client 110A are determined. Determine Needs Step 740 often includes merely retrieving information found in Test Client Step 720 and/or Determine Game Availability Step 730. For example, the need of a specific decoder can be determined based on the results of Test Client Step 720 and a minimum frame size can be determined based on the results of Determine Game Availability Step 730. Determine Needs Step 740 is an alternative embodiment of Determine Needs Step 410.

In a Provision Step 745 the selected Video Serving System 120 (and a Video Source 130 therein) are provisioned to provide the streaming video to Client 110A. Provision Step 745 optionally includes Select Game Logic Step 420, Provision Game Logic Step 425, Provision Driver Step 430, Select Preprocessor Step 435, Selected Encoder Step 440, Select Postprocessor Step 445, and/or Provision DEP Step 450, as discussed elsewhere herein. The provisioned logic and other computing instructions are optionally provisioned from Code Source 625.

In an Offer Game Step 750 the object requested in Receive Request Step 300 is provided to a game player on Client 110A. Offer Game Step 750 can include providing a pop-up browser window, changing an area of a web page already provided in Provide Page Step 710, sending an e-mail or text (SMS or MMS) message, sending a link, or direct streaming of game video. For example, in some embodiments a region of the web page provided in Provide Page Step 710 directly receives streaming game video with no further actions by the game player. The region within the web page can show, for example, streaming video of the starting line of MarioKart, or the character selection screen or a starting zone of World of Warcraft. The game player can begin game play by just selecting the region and starting to provide game commands. Optionally, the region of the web page can show streaming video including the avatar of a friend of the game player playing the game and an avatar of the game player. This allows the game player to instantly join a game with a friend. Friends can be identified using relationships established on social networking sites, for example. In some embodiments, Offer Game Step 750 is delayed until capacity to provide the streaming video becomes available. Offer Game Step 750 is optionally automatically performed once the capacity is available.

Offer Game Step 750 is contingent on Client 110A being qualified to receive streaming video of the game and that the game be available. Offer Game Step 750 is typically automatic once these conditions have been satisfied. In some embodiments, Offer Game Step 750 includes adding functionality to a web page already displayed to a game player in Provide Page Step 710. In these embodiments the requested object is already displayed but not fully functional. The added functionality makes it functional. The added functionality may be a proper link to a source of streaming video.

In a Deliver Game Step 755 the video stream is provided from the selected Video Server System 120 to Client 110A. Deliver Game Step 755 includes changing the contents of the video stream responsive to game commands received from the game player via Client 110A. Deliver Game Step 755 optionally includes providing one or more copies of the video stream to other destinations, e.g., to other IP addresses. These copies can have different characteristics than the video stream provided to Client 110A, but are based on the same game environment provided to Graphics Processing Unit 235. The other destinations include websites, storage locations, social networking sites, other Clients 110, and/or the like. The streaming video is optionally provided to all game players (and lurkers) within the same game room. A game room is a virtual room in which players can join, leave and play games as a group. A game room can include game players and optionally lurkers who observe but to not play the video game. Game rooms are useful when playing games designed for a group of players sitting around a game console and sharing a display device.

Deliver Game Step 755 optionally includes delivery of information other than the video stream to Client 110A. For example, Deliver Game Step 755 can include deliver of executable game code to Client 110A as a background process. This executable game code can allow eventual execution of the video game in a client side mode (where rendering occurs on Client 110A) rather than at Video Source 130.

In an optional Monitor Step 760 delivery of the streaming video to Client 110A is monitored. This monitoring can include making sure that the delivery of the streaming video meets a required quality of service. The monitoring can also include gathering further data characterizing the reliability and bandwidth of the communication channel between Client 110A and the selected Video Server System 120. In some embodiments, Monitor Step 760 includes monitoring for changes in the size of a browser window in which the streaming video is being presented on Client 110A. For example, if the game player changes the size of a browser window the monitoring may determine that a new frame size for the streaming video is warranted.

In an optional Add Game Player Step 765 a new game player and destination (e.g., Client 110) for the streaming video is added. This may occur, for example, when a new player enters a game room. The addition of a new game player may change the geographical distribution to which the streaming video is delivered. When this occurs Identify Servers Step 715, Test Client Step 720, Determine Server Availability Step 725, Determine Game Availability Step 730 and/or Select Server Step 735 may be repeated.

In an optional Change Server Step 770 delivery of the streaming video from the member of Video Server Systems 120 selected in Select Server Step 735 is transferred to a different member of Video Server Systems 120. This transfer may include provisioning the appropriate resources on the new Video Server System 120, optionally synchronizing execution of Game Logic 210 executing on the two Video Server Systems 120, and transferring delivery of the video stream. Further details of this process are disclosed in U.S. patent application Ser. No. 12/790,955 filed May 31, 2010 and entitled "Game Execution Environments."

Using the methods illustrated in FIG. 7 the utilization of Video Server Systems 120 can be controlled. For example, as game players are not offered to play video games unless there is capacity available spare capacity is not necessary. This allows for a high utilization rate (e.g., greater than 50, 75 or 80%) of Video Server Systems 120. In various embodiments, more than 80, 60 or 50% of requests received in Receive Request Step 300 are denied, even with more than ten of Video Server System 120. While the examples provided herein are primarily directed at the delivery of video, the systems and methods described herein can be applied to the generation of audio frames and the delivery of audio streams. In some embodiments, both video and audio streams are generated and provided as "audio-visual" streams.

Figure 8:
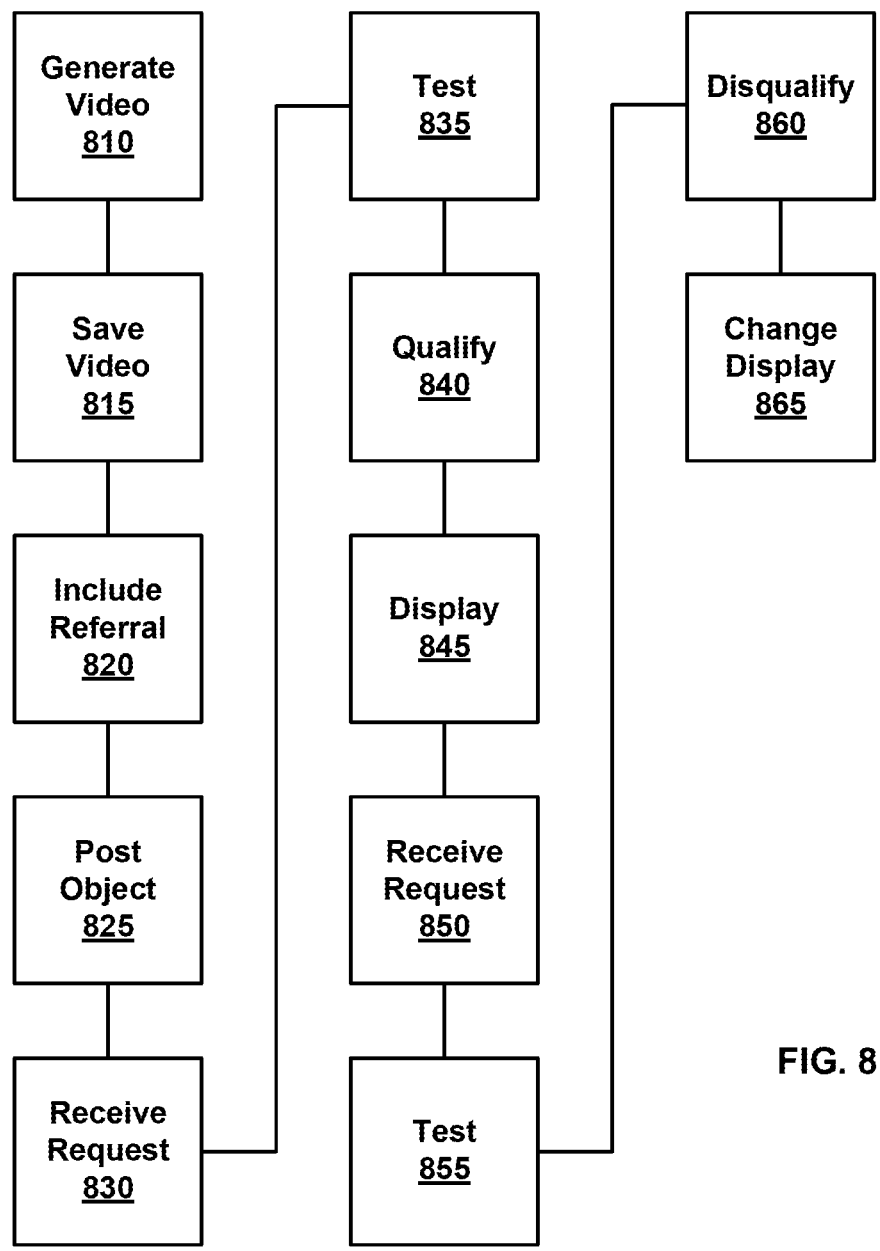
FIG. 8 illustrates methods of using a dynamic object on a social network website, according to various embodiments of the invention.

FIG. 8 illustrates methods of using a dynamic object on a social network website, according to various embodiments of the invention. The object is dynamic in that the functionality of the object is dependent on characteristics of a user and client visiting the website. As such, the object may function differently for different users. Further, the object optionally includes referral information regarding a user who posts the object on the social network website. This referral information can include game state information and or social network "friends" information.

The methods of FIG. 8 optionally begin with a Generate Video Step 810 in which game video is generated. Typically, the video is generated by playing of a video game. In one example, the video game is played using Client 110A and Video Server System 120 and the game video is generated using Video Source 130. The game video may be one of several game videos generated based on the same game state and point of view. For example, DEP 245A may be used to generate game video configured for display on Client 110A while DEP 245B is concurrently used to generate game video configured for display on a lower or higher resolution device. In alternative embodiments, the video is generated using a script, via recording of video using a camera, or via other video generation techniques known in the art.

In a Save Video Step 815 the game video generated in Generate Video Step 810 is stored. The video stored may be that displayed on Client 110A or video generated concurrently with that displayed. The storage typically occurs on a static storage device such as a hard drive or flash memory. The storage can be disposed on Video Server System 120, on a server of a social networking website, or in some other network accessible location. In some embodiments, Video Server System 120 is configured for a game player to indicate which game video should be stored and/or the location of the storage. Such stored video is sometimes referred to in the video game community as a "brag clip."

In an optional Include Referral Step 820 referral information is stored in an object that references the stored game video. This object is optionally a link, an advertisement, a text string, an image, and/or the like. Further examples of such objects are discussed elsewhere herein. The referral information includes information identifying a game player, typically the game player that generated the game video is Generate Video Step 810. The referral information optionally includes relationships, e.g., "friends," the game player has on a social networking website. In some embodiments, the referral information is configured to reward the game player for referring another player to the game. For example, the game player may receive an in-game or out of game reward.

In some embodiments the referral information includes game state information. For example, the game state information may include a location of an avatar in a game environment, an avatar faction (e.g., Alliance or Horde), an avatar race (e.g., Orc or Human), a game server (e.g., an instance of Game Server 125), a game level, the presence of certain in-game objects, avatar wealth, presence at an entry point in a game (e.g., at a starting line of a race or of a battle), and/or the like. Video Server System 120 is optionally configured to use such referral information to set initial conditions for another game player. For example, such referral information may be used to automatically set a game server and/or avatar faction, or position an avatar at a specific location in a game environment.

In a Post Object Step 825, the object is posted on a social networking website such as Facebook® or Myspace®. The object includes a link or other address of the stored game video, and optionally any referral information added in Include Referral Step 820. The object is optionally posted on a webpage associated with the game player that generated the game video. For example, the object may be automatically posted to a game player's Facebook page using a control of Video Server System 120. The object is configured to allow a second game player to play the video game, as an application executed on a client of the second game player and/or as an application executed remotely on Video Source 130 (remote from the client of the second game player). In typical embodiments, the second game player can play the video game by selecting (e.g., clicking on) the object. The object is optionally configured to cause Video Server System 120 to provide the video game to a client of the second game in response to this selection.

In a Receive Request Step 830, a request for the object is received. This request may be to display the object on a webpage of a social networking website and/or may result in a user visiting the webpage. In some embodiments, the request is received over Network 115 as a link from the webpage. The request is typically received from a different member of Clients 110 than was used to generate the game video in Generate Video Step 810.

In a Test Step 835 the display latency is tested between the member of Clients 110 from which the request is received and one or more instances of Video Server System 120. Test Step 835 is similar to Test Client Step 720 (FIG. 7). As discussed elsewhere herein, Test Step 835 may occur before or after the object is actually displayed on the requesting client. Test Step 835 results in information regarding the various latencies between the member of Clients 110 and one or more Video Server System 120. Test Step 835 optionally also results in information regarding the client, such as display resolution, decoding ability, CPU type, and/or the like.

In a Qualify Step 840 the test results generated in Test Step 835 are compared to minimum requirements to be satisfied in order to provide the game video at a minimum quality of service. The client is qualified if these requirements are met or exceeded. In some embodiments, qualification is made with regard to a plurality of alternative qualification levels. For example, the client may be alternatively qualified to receive 480 dpi or 1080 dpi video.

In a Display Step 845 the object is displayed on the qualified client. In some embodiments, the client must be qualified for the object to be displayed. In some embodiments the functionality of the displayed object is dependent on whether the client has been qualified. The object is optionally displayed on a page of the social networking website. This page can be a page of the game player that generated the game video, a page of a "friend" of this game player, and/or the like. Video included in the object is optionally video generated in real time, e.g., live video of the game being played that is displayed concurrently with its generation.

The displayed object can include a static image or the game video. For example, the game video may be automatically shown on the web page. In some embodiments, a static image is first displayed, the game video is played when the user first clicks on the object, and the user is taken into the game environment (engaged in playing the game) on a second click of the object. In some embodiments, the user is taken into the game environment on the first click. As described elsewhere herein, engaging a user in game play can include automatically creating a game account and/or using referral information to set an appropriate game state for an avatar of the user. For example, the user may automatically be assigned some avatar characteristics and the avatar may be placed in the game environment at a location near an avatar of the game player that created the game video in Generate Video Step 810. The user may be automatically added to a game room in which the game player that created the game video is playing. In some embodiments, a game room may be able to hold a limited number of players. For example, a car racing game may only allow four game players to play together. In these embodiments, the displayed object is optionally updated to show the number of players that can still be added to the game room. The displayed object may also include text, an invitation to play the video game, a description of the video game, and/or the like.

In a Receive Request Step 850 a request for the object is received from another member of Clients 110. Otherwise, Receive Request Step 850 is similar to Receive Request Step 830. A Test Step 855 is similar to Test Step 835 except that the tests are performed on the member of Clients 110 from which the request is received in Receive Request Step 850.

In a Disqualify Step 860 the client from which the request was received in Receive Request Step 850 is disqualified from receiving the object or only allowed to receive a version of the object with restricted functionality. In some embodiments, the consequences of Disqualify Step 860 is that added functionality of the object is not turned on, either before or after the object is displayed.

In a Change Display Step 865 a change in the display of the object on the social networking website is made. This change can occur before or after the display occurs. For example, before the display occurs the object can be substituted for an object having more or less functionality. Or, the functionality of the object can be changed after the display occurs, as described elsewhere herein. Change Display Step 865 can occur following Qualify Step 840 and/or Disqualify Step 860, and is in response to Qualify Step 840 and/or Disqualify Step 860. Typically, if the client is disqualified, e.g., fails to meet any qualification requirements, the functionality of the object is changed such that selecting the object no longer results in allowing a user of the second client to play the video game using remotely rendered video.

As illustrated in FIG. 8, Steps 810-825, Steps 830-845, Steps 850-860 and/or Step 865 may be optional and, thus, performed independently of each other. For example, Steps 810-825 are optional in embodiments wherein the game video is generated by a third party.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed to video games, the systems and methods discussed can be applied to other interactive video systems or applications. For example, the systems and methods can be adapted to other 2D or 3D applications including graphics programs, image manipulations programs, telepresence systems, word processing programs, e-mail programs, communication programs, spreadsheet programs, presentation programs, or the like. While the examples provided herein are primarily directed at the delivery of video, the systems and method described herein can be applied to the generation of audio frames and delivery of audio streams. In some embodiments, audio and video streams are generated and delivered together as part of an audio-video stream.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored in a non-transient manner on a computer readable medium. This logic may be implemented in an electronic device to produce a special purpose computing system.

What is claimed is:

1. A streaming video service system, comprising:
a video source configured to provide video data;
a video server system configured to receive an input from a client system of a user requesting streaming of a video to a television of the user, the video server system including at least one processor configured to process the received input to identify the user and to identify the requested video, the video server system configured to obtain the requested video from the video source;
a client qualifier configured to verify that the user is authorized to receive streaming of the requested video, the video server system configured to stream the requested video to the client system of the user for display on the television of the user upon verifying authorization of the user to receive streaming of the requested video; and
an advertisement source configured to provide data for an advertisement to the video server system, the advertisement including displayable content, the advertisement having at least a lower level of functionality and a higher level of functionality, the at least one processor of the video server system configured to transmit the advertisement to the client system of the user for display on the television of the user with the lower level of functionality of the advertisement enabled and with the higher level of functionality of the advertisement disabled, the advertisement including logic configured to enable the higher level of functionality of the advertisement after the advertisement is received at the client system of the user.

2. The streaming video service system as recited in claim 1, wherein the advertisement source is disposed outside of the video server system.

3. The streaming video service system as recited in claim 1, wherein the logic configured to enable the higher level of functionality of the advertisement is further configured to change the functionality of the advertisement from the lower level of functionality to the higher level of functionality in response to the client qualifier verifying that the user is authorized to receive streaming of the video.

4. The streaming video service system as recited in claim 1, wherein the client qualifier is configured to supply an agent to the client system of the user, wherein the agent is configured to direct change in the functionality of the advertisement from the lower level of functionality to the higher level of functionality by way of the logic within the advertisement that is configured to enable the higher level of functionality of the advertisement.

5. The streaming video service system as recited in claim 1, wherein the logic configured to enable the higher level of functionality of the advertisement is further configured to change the functionality of the advertisement from the lower level of functionality to the higher level of functionality by directing access of a modified universal resource locator upon selection of the advertisement at the client system of the user.

6. The streaming video service system as recited in claim 5, wherein the modified universal resource locator includes data indicating a bandwidth of a communication channel between the video server system and the client system of the user.

7. The streaming video service system as recited in claim 6, wherein the client qualifier is configured to determine the bandwidth of the communication channel between the video server system and the client system of the user.

8. The streaming video service system as recited in claim 5, wherein the modified universal resource locator includes data indicating a lag time of a communication channel between the video server system and the client system of the user.

9. The streaming video service system as recited in claim 8, wherein the client qualifier is configured to determine the lag time of the communication channel between the video server system and the client system of the user.

10. The streaming video service system as recited in claim 1, wherein the logic configured to enable the higher level of functionality of the advertisement is further configured to maintain an appearance of the advertisement as the functionality of the advertisement is changed from the lower level of functionality to the higher level of functionality.

11. The streaming video service system as recited in claim 1, wherein the logic configured to enable the higher level of functionality of the advertisement is further configured to change an appearance of the advertisement as the functionality of the advertisement is changed from the lower level of functionality to the higher level of functionality.

12. The streaming video service system as recited in claim 1, wherein the client qualifier is configured to determine one or more capabilities of the client system of the user, the one or more capabilities of the client system of the user including one or more of an operating system of the client system, a processor of the client system, a video decoder type of the client system, a type of network connection between the video server system and client system, a display resolution of the client system, a firewall present on the client system, hardware of the client system, software executing on the client system, and registry entries within the client system.

13. The streaming video service system as recited in claim 12, wherein the client qualifier is configured to automatically determine the one or more capabilities of the client system of the user.

14. The streaming video service system as recited in claim 1, wherein the client qualifier is disposed on a computing device separate from the video server system.

15. The streaming video service system as recited in claim 1, wherein the video server system is one of multiple video server systems connected to communicate with the client system of the user, wherein the client qualifier is configured to select the video server system from the multiple video server systems for streaming of the video to the client system of the user.

16. The streaming video service system as recited in claim 1, wherein the client qualifier is configured to direct installation of a required decoder on the client system of the user.

17. The streaming video service system as recited in claim 1, wherein the client qualifier is configured to determine a geographic location of the client system of the user, and wherein the client qualifier is configured to select the video server system to stream the video to the client system of the user based on a geographic proximity of the video server system to the geographic location of the client system of the user.

18. The streaming video service system as recited in claim 1, wherein the video source includes a video game engine and rendering logic.

19. The streaming video service system as recited in claim 18, wherein the video game engine is configured to receive game commands for a video game and maintain a game state of the video game based on the game commands and game rules.

20. The streaming video service system as recited in claim 19, wherein the rendering logic is configured to create video frames based on the game state to generate the requested video.

* * * * *